US008986136B2

(12) United States Patent
Alan

(10) Patent No.: US 8,986,136 B2
(45) Date of Patent: Mar. 24, 2015

(54) METHOD OF MAKING GOLF BALL WITH MATERIAL-FILLED GROOVES

(75) Inventor: Mark Alan, Portland, OR (US)

(73) Assignee: Nike Inc., Beaverton, OR (US)

( * ) Notice: Subject to any disclaimer, the term of this patent is extended or adjusted under 35 U.S.C. 154(b) by 593 days.

(21) Appl. No.: 13/337,928

(22) Filed: Dec. 27, 2011

(65) Prior Publication Data

US 2013/0161865 A1 Jun. 27, 2013

(51) Int. Cl.
*B29C 45/16* (2006.01)
*B29C 37/00* (2006.01)

(52) U.S. Cl.
CPC ......... *B29C 45/1671* (2013.01); *B29C 37/0053* (2013.01)
USPC ........... 473/374; 473/378; 473/383; 473/384; 473/376

(58) Field of Classification Search
CPC ........... A63B 37/0005; A63B 37/0011; A63B 37/0019; A63B 37/0034; B29C 37/0053; B29C 45/1671
USPC .......................... 473/378, 383, 384, 374, 376
See application file for complete search history.

(56) References Cited

U.S. PATENT DOCUMENTS

| 1,482,232 | A | | 1/1924 | Hazeltine | |
|---|---|---|---|---|---|
| 1,855,448 | A | | 4/1932 | Hazeltine | |
| 5,691,418 | A | * | 11/1997 | Hagman et al. | 525/196 |
| 6,012,992 | A | | 1/2000 | Yavitz | |
| 6,193,617 | B1 | | 2/2001 | Mertens | |
| 6,217,463 | B1 | * | 4/2001 | Maruko et al. | 473/370 |
| 6,368,236 | B1 | * | 4/2002 | Sullivan et al. | 473/377 |
| 6,383,091 | B1 | | 5/2002 | Maruko et al. | |
| 6,398,667 | B1 | | 6/2002 | Lemons | |
| 6,575,847 | B1 | * | 6/2003 | Yamagishi et al. | 473/374 |
| 6,699,143 | B2 | | 3/2004 | Nardacci et al. | |
| 6,802,787 | B2 | | 10/2004 | Ogg | |
| 7,041,011 | B2 | | 5/2006 | Sullivan et al. | |
| 7,195,564 | B2 | | 3/2007 | Han | |
| 7,601,080 | B2 | | 10/2009 | Olson et al. | |
| 2007/0040300 | A1 | * | 2/2007 | Kennedy et al. | 264/275 |
| 2008/0026875 | A1 | * | 1/2008 | Kennedy et al. | 473/384 |
| 2008/0261725 | A1 | * | 10/2008 | Olson et al. | 473/384 |
| 2009/0017941 | A1 | | 1/2009 | Sullivan et al. | |
| 2012/0010025 | A1 | * | 1/2012 | Chou et al. | 473/378 |

FOREIGN PATENT DOCUMENTS

JP 2008155013 7/2008

* cited by examiner

*Primary Examiner* — Joseph S Del Sole
*Assistant Examiner* — Lawrence D Hohenbrink, Jr.
(74) *Attorney, Agent, or Firm* — Quinn Law Group, PLLC

(57) ABSTRACT

A method of making a golf ball may include molding at least one core layer and molding an outer cover layer radially outward of the at least one core layer, from an outer cover layer material, including forming one or more grooves extending radially inward from an outer surface of the outer cover layer. The method may also include molding a groove material within the one or more grooves, the groove material having a compressibility that is different from a compressibility of the outer cover layer material. In addition, molding the groove material may include forming the groove material such that an outer surface of the groove material extends radially outward beyond the outer surface of the outer cover layer.

32 Claims, 15 Drawing Sheets

METHOD OF MAKING GOLF BALL WITH MATERIAL-FILLED GROOVES

TECHNICAL FIELD

The present invention relates generally to golf balls and, more particularly, to golf balls having surface grooves with compressible materials in the grooves.

BACKGROUND

A golfer typically selects a golf ball that has a combination of features and performance characteristics based on his or her preferences and/or skill. The various performance characteristics may be provided by selection of materials and structural configurations, as well as manufacturing techniques. Different portions of the ball (for example the inner core and the outer surface layers) may be formed to have differing mechanical properties and other physical attributes. These differing properties and attributes determine the performance characteristics of the ball. For example, a ball having more weight toward the outer surface will maintain more spin during flight, which may be desired by the player. In addition, the hardness and/or compressibility of different portions of the ball influence the distance, control, and feel of the ball when played.

Golf balls have been developed that utilize relatively soft and/or compressible outer layer materials to improve spin and/or feel. However, soft and/or compressible materials may lack desired levels of durability for use in a surface layer of a golf ball, which experiences significant amounts of abuse from contact with golf club heads and from the ground. In addition, golf balls having soft and/or compressible outer layers may not provide desired levels of distance when struck.

In addition, the aerodynamics of the golf ball outer surface also influences the performance characteristics of the ball. Golf balls have been developed having dimples or grooves to provide desired aerodynamic effects. However, such balls have not taken advantage of the discontinuity in the outer surface of the ball by incorporating different materials in the dimples and/or grooves.

Some golf balls have been developed that include inner materials that penetrate the outer cover layer at some points, for example, to provide indicia on the outer surface of the ball. These golf balls are provided with a minimal difference between the hardness of the inner material and the outer cover layer material, for example, for example no greater than 15%, in order to provide consistency in the performance characteristics of the outer surface of the ball. Thus, such exposed inner materials are not implemented to provide an enhanced performance attribute, but rather, are merely for aesthetic benefit (as indicia). In other cases, hard material inlays, such as stripes, have been provided on golf balls, to provide different play characteristics depending on where on the outer surface the ball is struck. However, such differing play characteristics are prohibited by some rule-making golf organizations.

Some golf balls have been developed that utilize plugs that extend through the outer cover layer. The plugs may have a higher or lower hardness than the outer cover layer material. However, these plugs are flush with the outer surface of the outer cover layer. Accordingly, embodiments having softer plugs may be susceptible to wear of the plugs, since the softer materials may be less durable than the harder outer cover layer.

The present disclosure is directed to improvements in golf balls.

SUMMARY

In one aspect, the present disclosure is directed to a golf ball. The golf ball may include an inner core layer and an outer cover layer disposed radially outward of the inner core layer. The outer cover layer may be formed of an outer cover layer material having one or more grooves extending radially inward from an outer surface of the outer cover layer. In addition, the golf ball may include a groove material disposed within the one or more grooves. The groove material may have a compressibility that is different from a compressibility of the outer cover layer material. Also, the outer surface of the groove material may extend radially outward beyond the outer surface of the outer cover layer.

In another aspect, the present disclosure is directed to a golf ball. The golf ball may include an inner core layer and an outer cover layer disposed radially outward of the inner core layer. The outer cover layer may be formed of an outer cover layer material having one or more grooves extending radially inward from an outer surface of the outer cover layer. In addition, the golf ball may include a groove material disposed within the one or more grooves. The groove material may have a compressibility that is different from a compressibility of the outer cover layer material. Also, an outer surface of the groove material may be recessed from the outer surface of the outer cover layer.

In another aspect, the present disclosure is directed to a golf ball. The golf ball may include an inner core layer and an outer cover layer disposed radially outward of the inner core layer. The outer cover layer may be formed of an outer cover layer material having one or more grooves extending radially inward from an outer surface of the outer cover layer. In addition, the golf ball may include a groove material disposed within the one or more grooves and forming a portion of an outer surface area of the golf ball. The groove material may have a compressibility that is less than a compressibility of the outer cover layer material. Also, the outer cover layer material may constitute a substantial majority of the outer surface area of the golf ball. Further, an outer surface of the groove material may be substantially flush with the outer surface of the outer cover layer.

In another aspect, the present disclosure is directed to a method of making a golf ball. The method may include molding at least one core layer and molding an outer cover layer radially outward of the at least one core layer, from an outer cover layer material, including forming one or more grooves extending radially inward from an outer surface of the outer cover layer. The method may also include molding a groove material within the one or more grooves, the groove material having a compressibility that is different from a compressibility of the outer cover layer material. In addition, molding the groove material may include forming the groove material such that an outer surface of the groove material extends radially outward beyond the outer surface of the outer cover layer.

In another aspect, the present disclosure is directed to a method of making a golf ball. The method may include molding at least one core layer and molding an outer cover layer radially outward of the at least one core layer, from an outer cover layer material, including forming one or more grooves extending radially inward from an outer surface of the outer cover layer. In addition, the method may include molding a groove material within the one or more grooves, the groove material having a compressibility that is different from a compressibility of the outer cover layer material. Also, molding the groove material may include forming the groove material such that an outer surface of the groove material is recessed from the outer surface of the outer cover layer.

In another aspect, the present disclosure is directed to a method of making a golf ball. The method may include molding at least one core layer and molding an outer cover layer radially outward of the at least one core layer, from an outer cover layer material, including forming one or more grooves extending radially inward from an outer surface of the outer cover layer. In addition, the method may include molding a groove material within the one or more grooves, the groove material having a compressibility that is less than a compressibility of the outer cover layer material. Also, molding the groove material may include forming the groove material such that an outer surface of the groove material is substantially flush with the outer surface of the outer cover layer, and such that the outer cover layer material constitutes a substantial majority of the outer surface area of the golf ball.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Overview

The present disclosure relates generally to grooved golf balls. More specifically, the present disclosure relates to grooved golf balls having material in the grooves that is softer than other portions of the outer layer.

The performance characteristics of a golf ball are determined, at least in part, by the structural configuration of the layers and/or the material compositions of the layers. The overall performance characteristics of the golf ball are affected in certain ways by the makeup of individual layers and also reflect the combination and arrangement of the layers and materials from which the golf ball is formed. The concepts discussed in the present disclosure may be applicable to golf balls having any construction, including any suitable number of layers.

Further, although the disclosure describes various grooved configurations for golf balls, a person having ordinary skill in the art will be able to adapt the disclosed concepts for implementation in other types of balls (other than golf balls) and other types of layered articles. For example, the disclosed concepts may be applicable to any layered article, such as a projectile, recreational device, or individual components of these articles.

Definitions

For purposes of this disclosure, the terms "compressible," "compressibility," and the like refer to the amount deformation exhibited by an object when compressed under a predetermined set of loading parameters. As used in the present disclosure, compressibility shall refer to compression deformation, which is the deformation amount (in millimeters) of an object when compressed by a force, specifically, the deformation of the object when the compression force is increased from 10 kg to 130 kg. The deformation amount of the object under the force of 10 kg is subtracted from the deformation amount of the object under the force of 130 kg to obtain the compression deformation value of the object. While compressibility (and compression deformation) is a parameter that may be measured for entire golf balls, compressibility can also be measured for individual components of golf balls. In the present disclosure, compressibility of a golf ball groove material is measured and discussed in detail.

Hardness of a golf ball layer is measured generally in accordance with ASTM D-2240. In some cases the hardness may be measured on a cross-sectional surface of a ball layer. In other cases, the hardness may be measured on the curved surface of a ball layer.

Golf Ball Structure Generally

Figure 1:
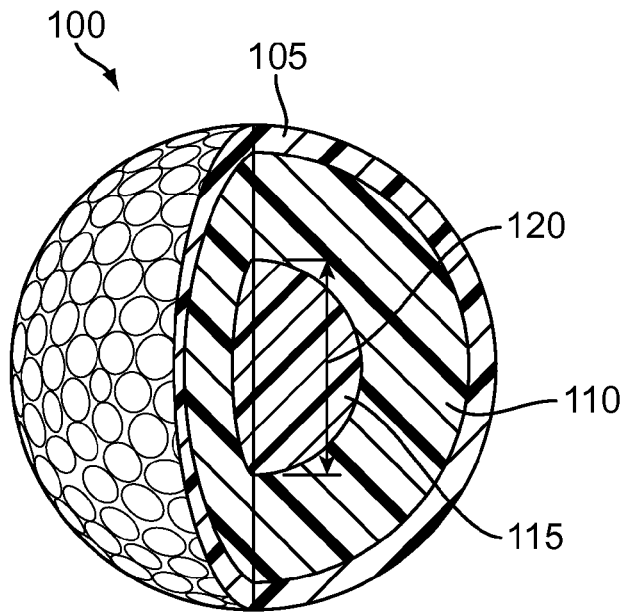
FIG. 1 shows a cutaway, partial cross-sectional view of an exemplary golf ball having a three-piece construction.
Figure 2:
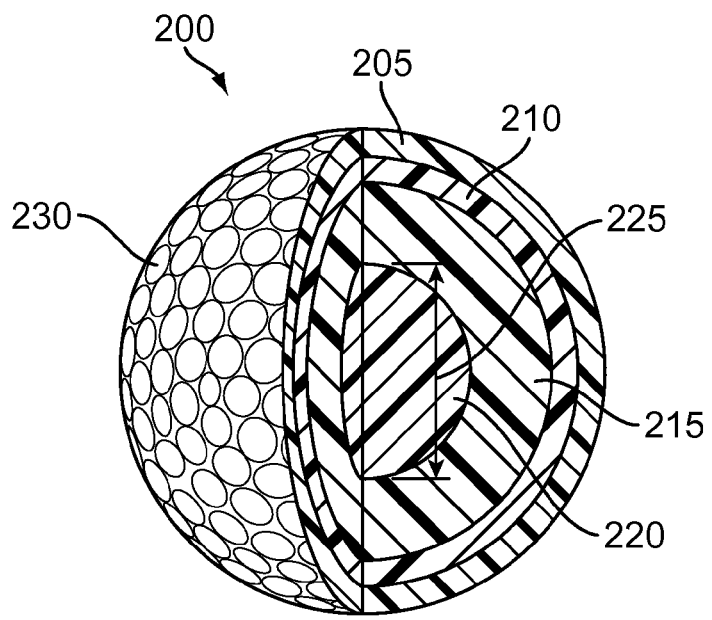
FIG. 2 shows a cutaway, partial cross-sectional view of an exemplary golf ball having a four-piece construction.

The disclosed concepts may be applicable to golf balls having any internal structural configuration. FIGS. 1 and 2 illustrate exemplary 3-layer and 4-layer golf ball constructions, respectively.

3-Layer Ball Structure

FIG. 1 illustrates a cutaway, partial cross-sectional view of an exemplary three-layer golf ball construction. As shown in FIG. 1, a golf ball 100 may include a cover layer 105, an outer core layer 110 disposed radially inward of cover layer 105, and an inner core layer 115 disposed radially inward of outer core layer 110. The dimensions and materials of each layer may be selected to achieve desired performance characteristics.

Cover layer 105 may be formed of a relatively soft but durable material. For example, cover layer 105 may be formed of a material that compresses/flexes when struck by a golf club, in order to provide spin of the ball and feel to the player. Although relatively soft, the material may also be durable, in order to withstand scuffing from the club and/or the golf course. Exemplary cover layer materials may include urethane or ionomer blends, and/or any other suitable material.

In addition, FIG. 1 illustrates the outer surface of cover layer 105 as having a generic dimple pattern. While the dimple pattern on golf ball 100 may affect the flight path of golf ball 100, any suitable dimple pattern may be used with the disclosed embodiments. In some embodiments, golf ball 100 may be provided with a dimple pattern including a total number of dimples between approximately 300 and 400.

Outer core layer 110 may be formed of a relatively firm and suitably resilient material. Outer core layer 110 may be configured to provide a relatively high launch angle and a relatively low spin rate when the ball is struck by a driver, and a relatively higher spin rate and increased control when struck with irons. This may provide distance off the tee with spin and control around the greens. Inner core layer 115 may be formed of a relatively firm material in order to provide distance.

The thickness of the golf ball layers may be varied in order to achieve desired performance characteristics. In some embodiments, inner core layer 115 may have a diameter in the range of about 19 mm to 30 mm. For example, in some embodiments, inner core layer 115 may be spherical with a diameter 120 of approximately 24 mm to 28 mm.

4-Layer Ball Structure

FIG. 2 is a cutaway, partial cross-sectional view of a golf ball 200 having a four-piece construction. As shown in FIG. 2, golf ball 200 may have four layers that are positioned adjacent one another. For example, in some embodiments, golf ball 200 may include an outer cover layer 205 and an inner cover layer 210 disposed radially inward of outer cover layer 205. Golf ball 200 may also include an outer core layer 215 disposed radially inward of inner cover layer 210, and an inner core layer 220 disposed radially inward of outer core layer 215. Any layer may surround or substantially surround any layers disposed radially inward of that layer. For example, outer core layer 215 may surround or substantially surround inner core layer 220.

As shown in FIG. 2, golf ball 200 may dimples 230 which may be formed in outer cover layer 205. As noted above, dimples 230 may have any suitable configuration.

In the present disclosure and drawings, golf ball 200 is described and illustrated as having four layers. In some embodiments, at least one additional layer may be added. For example, in some embodiments, a mantle layer may be added between outer core layer 215 and inner cover layer 210. In some embodiments, an intermediate cover layer may be inserted between inner cover layer 210 and outer cover layer 205. Further, in some embodiments, an intermediate core layer may be inserted between inner core layer 220 and outer core layer 215. Other layers may be added on either side of any disclosed layer as desired to achieve certain performance characteristics and/or attributes.

In some embodiments, golf ball 200 may have a diameter of at least 42.67 mm (1.680 inches), in accordance with the Rules of Golf. For example, in some embodiments, golf ball 200 may have a ball diameter between about 42.67 mm and about 42.9 mm, and may, in some embodiments, have a ball diameter of about 42.7 mm. Golf ball 200 may have a ball weight between about 45 g and about 45.8 g and may, in some embodiments, have a ball weight of about 45.4 g.

The thickness of the layers of golf ball 200 may be varied in order to achieve desired performance characteristics. In some embodiments, outer cover layer 205 may have a thickness of approximately 0.5 mm to 2 mm. In addition, in some embodiments, inner cover layer 210 may have a thickness of approximately 0.5 mm to 2 mm. In some embodiments, outer cover layer 205 and/or inner cover layer 210 may have a thickness of approximately 0.8 mm to 2 mm. In some embodiments, outer cover layer 205 and/or inner cover layer 210 may have a thickness of approximately 1 mm to 1.5 mm.

In some embodiments, outer core layer 215 may have a thickness of at least about 5 mm. In some embodiments, inner core layer 220 may be a sphere having a diameter 225 in the range of approximately 21 mm to 30 mm. In some embodiments, diameter 225 of inner core layer 220 may be in the range of approximately 24 mm to 28 mm. For example, in some embodiments, diameter 225 may be 24 mm. In other embodiments, diameter 225 may be 28 mm.

In some embodiments, the inner core layer may be formed by any suitable process, such as injection molding or compression molding. Further the inner core layer may be formed of any suitable material, such as a thermoplastic material, for example. In some embodiments, suitable thermoplastic materials may include, for example, an ionomer resin, such as Surlyn, produced by E. I. Dupont de Nemous and Company. In some embodiments, the inner core layer may be formed from a highly neutralized acid polymer composition. Exemplary highly neutralized acid polymer compositions suitable for forming the inner core layer may include, for example, HPF resins such as HPF1000, HPF2000, HPF AD1024, HPF AD1027, HPF AD1030, HPF AD1035, HPF AD1040, all produced by E. I. Dupont de Nemous and Company.

The acid polymer may be neutralized to 80% or higher, including up to 100%, with a suitable cation source, such as magnesium, sodium, zinc, or potassium. Suitable highly neutralized acid polymer compositions for use in forming the inner core layer may include a highly neutralized acid polymer composition and optionally additives, fillers, and/or melt flow modifiers.

Suitable additives and fillers may include, for example, blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, acid copolymer wax, surfactants. In some embodiments, the additives and fillers may include, for example, inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and other types of organic fillers. In some embodiments, the additives and fillers may include, for example, high specific gravity metal powder fillers, such as tungsten powder, molybdenum powder, and others. In some embodiments the additives and fillers may include regrind, that is, core material that is ground and recycled.

Any suitable melt flow modifiers may be included in the highly neutralized acid polymer composition. Exemplary suitable melt flow modifiers may include, for example, fatty acids and salts thereof, polyamides, polyesters, polyacrylates, polyurethanes, polyethers, polyureas, polyhydric alcohols, and combinations thereof.

The outer core layer may be formed by any suitable method, such as compression molding. Further, the outer core layer may be formed of any suitable material, such as a thermoset material. For example, in some embodiments, outer core layer 215 may be formed by crosslinking a polybutadiene rubber composition. When other rubber is used in combination with a polybutadiene, polybutadiene may be included as a principal component. For example, a proportion of polybutadiene in the entire base rubber may be equal to or greater than 50% by weight and, in some embodiments, may be equal to or greater than 80% by weight. In some embodiments, outer core layer 215 may be formed of a polybutadiene rubber composition including a polybutadiene having a proportion of cis-1,4 bonds of equal to or greater than 60 mol %. For example, in some embodiments, the proportion may be equal to or greater than 80 mol %.

In some embodiments, cis-1,4-polybutadiene may be used as the base rubber and mixed with other ingredients. In some embodiments, the amount of cis-1,4-polybutadiene may be at least 50 parts by weight, based on 100 parts by weight of the rubber compound. Various additives may be added to the base rubber to form a compound. The additives may include a cross-linking agent and a filler. In some embodiments, the cross-linking agent may be zinc diacrylate, magnesium acrylate, zinc methacrylate, or magnesium methacrylate. In some embodiments, zinc diacrylate may provide advantageous resilience properties.

In some embodiments, the filler may include zinc oxide, barium sulfate, calcium carbonate, or magnesium carbonate. In some embodiments, zinc oxide may be selected for its advantageous properties. In some embodiments, the filler may be used to increase the specific gravity of the material. For example, metal powder, such as tungsten, may alternatively be used as a filler to achieve a desired specific gravity. In some embodiments, the specific gravity of outer core layer 215 may be in the range of about 1.05 g/cm^3 to about 1.35 g/cm^3.

In some embodiments, a polybutadiene synthesized using a rare earth element catalyst is preferred. Using this polybutadiene may provide golf ball 200 with increased resilience. Examples of rare earth element catalysts include lanthanum series rare earth element compound, organoaluminum compound, and almoxane and halogen containing compound. A lanthanum series rare earth element compound is preferred. Polybutadiene obtained by using lanthanum rare earth-based catalysts usually employ a combination of a lanthanum rare earth (atomic number of 57 to 71) compound, but particularly preferred is a neodymium compound.

In some embodiments, the polybutadiene rubber composition may comprise at least from about 0.5 parts by weight to about 5 parts by weight of a halogenated organosulfur compound. In some embodiments, the polybutadiene rubber composition may comprise at least from about 1 part by weight to about 4 parts by weight of a halogenated organosulfur compound. The halogenated organosulfur compound may be selected from the group consisting of pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol; pentabromothiophenol; 2-bromothiophenol; 3-bromothiophenol 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; and their zinc salts, the metal salts thereof and mixtures thereof.

One or more cover layers may be molded to enclose the outer core layer. The cover layers may be formed of any suitable materials. For example, in some embodiments, cover layers may be formed from thermoplastic or thermoset materials. In some embodiments, inner cover layer 210 and/or outer cover layer 205 may be made from a thermoplastic material including at least one of an ionomer resin, a highly neutralized acid polymer composition, a polyamide resin, a polyester resin, and a polyurethane resin. In some embodiments, an ionomer resin, polyurethane resin, or highly neutralized acid polymer composition may be more preferred for inner cover layer 210 or outer cover layer 205. In some embodiments, inner cover layer 210 may be formed of the same type of material as outer cover layer 205. In other embodiments, inner cover layer 210 may be formed of a different type of material from outer cover layer 205.

The disclosed concepts may be implemented in golf balls having three-layer construction, four-layer construction, five-layer construction, or any other suitable configuration. Exemplary such concepts are discussed below.

Grooved Configurations

In some embodiments, an exemplary disclosed golf ball may include features that provide increased spin and/or feel when struck. In order to provide such characteristics, the golf ball may be provided with one or more components formed of a material having an increased compressibility. That is, the material may deflect a greater amount when exposed to a given amount of force than a relatively less compressible material. In order to provide increased spin and/or feel, such compressible material may be disposed radially outward from the center of the ball, for example at or near the outer surface of the ball.

It is generally desirable for a golf ball to exhibit minimal spin when struck with a driver. Further, when a golf ball is struck with a club moving at a relatively high club head speed, such as a driver, the amount of deformation of the ball is significant, such that the properties of the core and other inner layers of the ball determine the playing characteristics, particularly distance. For these reasons, it may be desirable to provide a golf ball with a relatively hard and incompressible outer cover layer. An outer cover layer that is too compressible may be too "grippy" and thus produce more spin, even when struck with a driver. Further, a compressible outer cover layer would tend to absorb some of the energy of the impact with the club head and, therefore, reduce the distance achievable with the ball.

During short game play, however, it may be desirable for a golf ball to exhibit greater amounts of spin and feel. Greater amounts of spin facilitate greater control of the ball. During short game play, where club head speeds are relatively slower, the compressibility of the cover layers of the ball determine the playing characteristics, since the ball is not typically struck hard enough to compress the inner layers of the ball. Increased spin may be provided by a compressible outer cover layer material. Further, such a compressible outer cover layer may also provide improved feel of the ball when struck at relatively slow club head speeds. Thus, the desirability of having a compressible cover for short game play (e.g., playing with irons) may be in conflict with the desirability of having a relatively incompressible cover for long game play (e.g., hitting with a driver).

The present disclosure provides ball configurations, which implement both compressible and incompressible materials in the cover in order to produce a ball that has both good distance with low spin when struck with a driver, and increased spin and feel when struck with a short game club (e.g., irons, pitching wedge, sand wedge). In some embodiments, an exemplary disclosed golf ball may include one or more core layers and one or more cover layers. In some embodiments, an outermost cover layer, formed of a first material, having formed therein one or more grooves. For example, such grooves may include one or more channels, which may be formed in any suitable configuration. In some embodiments, for example, the outermost cover layer may include at least one spiral channel. In some embodiments, the cover layer may include circular grooves or circumferential grooves, which may be arranged in a grid about the outer surface of the ball.

In order to provide the increased spin and/or feel, a relatively compressible material may be disposed within the one or more grooves. Such material may have a compressibility that is less than the compressibility of the outermost cover layer material. In some embodiments, the outer cover layer material may constitute a substantial majority of the outer surface area of the golf ball and the outer surface of the material disposed in the grooves may constitute a substantial minority of the outer surface area of the golf ball.

In some embodiments, the golf ball may include features that affect the aerodynamics of the ball. For example, in some embodiments, the outer surface of the material disposed in the grooves may extend beyond or may be recessed from the outer surface of the outermost cover layer. Therefore, the ball may include either bulges and/or recesses in the outer surface, which may have an effect on aerodynamics. In some embodiments the aerodynamic effect may be a reduction in drag coefficient, to improve distance and/or spin. In other embodiments, the effect may be an increase in drag coefficient, possibly in exchange for increased or decreased spin and/or control. In some embodiments, the orientation of the bulges and/or recesses may induce spin during flight. For example, a spiral arrangement of elongate bulges and/or recesses may cause a particular spin of the ball during flight.

Figure 3:
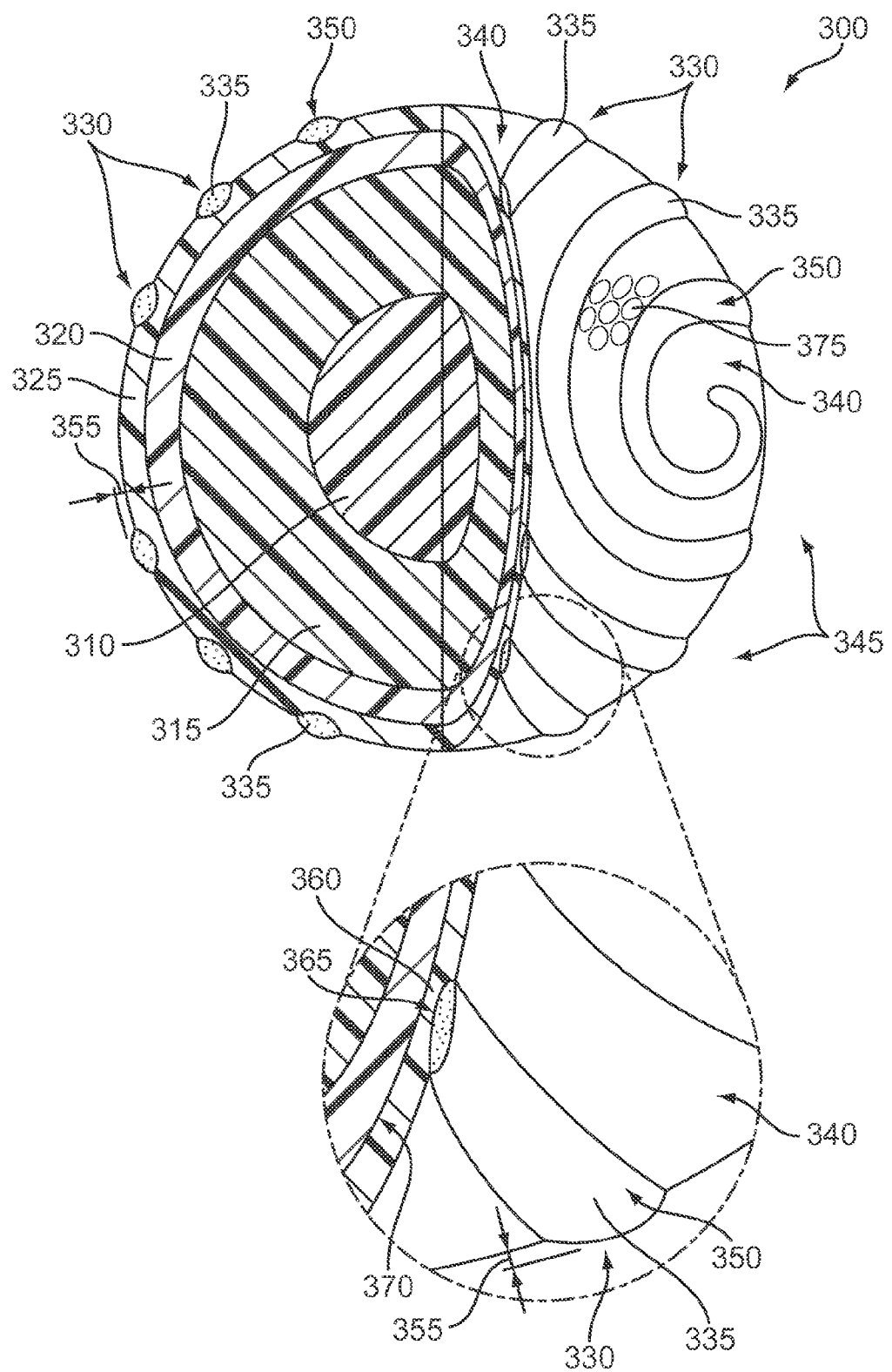
FIG. 3 shows a cutaway, partial cross-sectional view of an exemplary golf ball having material-filled spiral grooves in an outer layer.

FIG. 3 illustrates an exemplary golf ball 300. Ball 300 may include an inner core layer 310 and an outer core layer 315 disposed radially outward of inner core layer 310. In addition, ball 300 may include an inner cover layer 320 disposed radially outward of outer core layer 315, and an outer cover layer 325 disposed radially outward of inner cover layer 320. These layers may be configured generally as discussed above with respect to FIGS. 1 and 2. In some embodiments, ball 300 may have more or fewer layers. Suitable materials for inner core layer 310, outer core layer 315, inner cover layer 320, and outer cover layer 325 are discussed above. Other suitable materials will be recognized by those having ordinary skill in the art.

For purposes of this disclosure and claims, the outer cover layer shall be referred to, in some cases, as the "outermost layer" of the golf ball. Similarly, the term "outermost surface area" of the golf ball is used in reference to the outer surface of the disclosed layers. It will be understood by those having ordinary skill in the art, however, that one or more finish coatings, including paint or other colorations, as well as one or more topcoats or clearcoats may be applied to an outer surface of the disclosed layers. These finish coatings have relatively insignificant thickness and, therefore, the outer surfaces of the disclosed layers are effectively the outermost surfaces of the golf ball, from a structural standpoint.

According to exemplary disclosed embodiments, spin and/or feel of the golf ball may be increased by the inclusion of a relatively compressible material at and/or near the outer surface of the outer cover layer. In some embodiments, a second material may be molded into the grooves of the outer cover layer, wherein the second material has a compressibility that is different than the compressibility of the outer cover layer material. For example, in some embodiments, a material that is more compressible than the outer cover layer material may be molded into the grooves. In other embodiments, the outer cover layer material may be more compressible than the material molded into the grooves. Although the material molded into the grooves ("groove material") may be more or less compressible than the outer cover layer, for purposes of discussion, the embodiments discussed below, unless otherwise noted, will be described as having a groove material that is more compressible than the outer cover layer material.

In some embodiments, the outer surface of the groove material forms a portion of the outer surface of the ball. The surface area and thickness of the groove material may be factors in the extent to which the groove material affects the spin and feel of the ball. Generally, the greater the amount of exposed surface area and/or thickness of a compressible material, the greater the increases in spin and feel will be. A compressible material will exhibit more grip against the club face, much like a soft compound tire provides more road grip. Therefore the amount of compressible material surface area will affect the amount of grip the ball will have against the club face. This increase in grip provides more spin and feel when striking the ball. In addition, the thickness of the compressible material has a similar effect on grip, the thickness of the compressible material is related to the amount of compressible material present at the outer portion of the ball. The more compressible material present at the outer portion of the ball, the more the outer portion deforms when struck, even on short game strikes, which tend to be less forceful.

In order to limit the increase in spin provided by the inclusion of compressible groove material, the groove material may constitute a limited amount of the outer surface area of the ball. For example, in some embodiments, the outer surface of the outer cover layer may constitute a substantial majority of the overall surface area of the ball, and the outer surface of the groove material may constitute a substantial minority of the outer surface of the ball. In other embodiments, the outer surface of the groove material may constitute a substantial majority of the outer surface area of the ball, and the outer surface of the outer cover layer may constitute a substantial minority of the outer surface area of the ball. This configuration may be advantageous, for example, when the outer cover layer material is more compressible than the groove material.

In addition, the extent to which the groove material extends radially beyond the outer surface of the outer cover layer may also influence the spin and feel. In some embodiments, the groove material may partially fill the grooves, and thus, may have an outer surface that is recessed from the outer surface of the outer cover layer. In some embodiments, the groove material may completely fill the grooves. For example, in some embodiments, the outer surface of the groove material may be substantially flush with the outer surface of the outer cover layer. In some embodiments, the outer surface of the groove material may overfill the grooves, bulging out such that the outer surface of the groove material extends radially outward beyond the outer surface of the outer cover layer. Generally, the greater the distance of a groove material from the center of the ball (relative to the outer surface of the outer cover layer), the greater the increases in spin and feel. The further the groove material extends radially, the more surface area of the groove material will be engaged by the club face and the less surface area of the outer cover layer will be engaged by the club face, thus providing increased grip against the club face, resulting in increased spin and feel.

In some embodiments, outer cover layer 325 may include a groove 330 extending radially inward from an outer surface 340 of outer cover layer 325. In some embodiments, groove 330 may have the form of an elongate channel. Such channels may have any suitable configuration, such as, for example a spiral arrangement, as shown in FIG. 3. As further illustrated in FIG. 3, groove 330 may be a continuous spiral groove encircling golf ball 300 and extending substantially from one side of the golf ball to an opposite side of the golf ball. Other embodiments may incorporate more than one channel, such as a plurality of spiral grooves. Other arrangements are also possible. In addition, groove 330 may have any suitable shape, length, width, and depth. Exemplary alternative groove configurations are shown in the figures and discussed below.

Ball 300 may include a groove material 335 disposed within groove 330. In some embodiments, groove material 335 may have a compressibility that is different from the compressibility of the material from which outer cover layer 325 is formed. In some embodiments, groove material 335 may be more compressible than the material of outer cover layer 325. In other embodiments, groove material 335 may be less compressible than outer cover layer 325.

In some embodiments, groove material 335 may have a hardness that is different than the hardness of outer cover layer 325. For example, in some embodiments, groove material 335 may have a hardness that is lower than the hardness of outer cover layer material 325. In such embodiments, the harder outer cover layer material may provide durability to the outer surface 345 of ball 300, while the softer groove material 335 may provide increased spin and/or feel. In other embodiments, groove material 335 may have a hardness that is greater than the hardness of outer cover layer 325.

The placement of the relatively compressible groove material 335 in the cover region of ball 300, radially displaced from the center of ball 300, may enhance the increase in spin and/or feel provided by compressible groove material 335. In addition, the compressible groove material 335 may further enhance the increase in spin and/or feel in some embodiments where groove material 335 extends radially outward beyond outer surface 340 of outer cover layer 325. For example, as shown in FIG. 3, an outer surface 350 of groove material 335 may extend radially outward beyond outer surface 340 of outer cover layer 325. A bulge dimension 355, shown in FIG. 3, illustrates an exemplary amount by which outer surface 350 of groove material 335 may extend beyond outer surface 340. Exemplary alternative configurations with respect to the relative placement the outer surfaces of the groove material and the outer cover layer are shown and discussed in greater detail in conjunction with other disclosed embodiments.

The cross-sectional shape and the depth of groove 330 within outer cover layer 325 may have a number of possible configurations, as shown and discussed with respect to several exemplary disclosed embodiments. In one possible configuration shown in FIG. 3, groove 330 may have a curved cross-sectional shape, such that a bulged groove material 335 appears to have an American football-shaped cross-sectional shape. In addition, in some embodiments, groove 330 may extend partially through outer cover layer 325, thus forming a recess in outer cover layer 325, such that a portion 360 of outer cover layer 325 may extend between an inner surface 365 of groove material 335 and an outer surface 370 of inner cover layer 320, which may be a different material than outer cover layer 325 and groove material 335.

The bulging of groove material 335 beyond outer surface 340 of outer cover layer 325 may provide at least two benefits. First, the bulging groove material 335 may provide ball 300 with a different surface area when struck hard, such as with a driver, than when struck more easily, such as on short game strokes. When struck hard, the compressibility of groove material 335 may allow groove material 335 to deflect (compress) such that outer surface 350 of groove material 335 becomes substantially flush with outer surface 340 of outer cover layer 325. Thus, the surface area of outer surface 345 of ball 300 that contacts the club face when struck hard, will be constituted of all of outer surface 340 and outer surface 350 in the area of ball 300 struck by the club face. In such situations, since the surface area of outer cover layer 325 may constitute a substantial majority of outer surface 345 of ball 300, when ball 300 is struck hard, more of the contact area between ball 300 and the club face will be constituted by outer surface 340 of outer cover layer 325. Since outer cover layer 325 may be less compressible than groove material 335, this may be beneficial when driving the ball, because less spin is desired for drives.

When struck lightly, groove material 335 may not compress completely. Accordingly, a larger proportion of the surface area of ball 300 contacting the club face will be constituted by outer surface 350 of groove material 335. This may provide a grippier surface of ball 300, thus producing more spin and providing increased feel.

A second benefit is that the bulging of groove material 335 may provide an aerodynamic effect. The bulges of groove material 335 may disrupt airflow around ball 300, disrupting airflow in much the same way dimples do on a conventional golf ball. In addition, the pattern of bulging groove material 335 may induce other aerodynamic effects. For example, a spiral arrangement, such as that shown in FIG. 3, may induce a particular spin during flight. In some embodiments, this induced spin may enhance spin generated at club face contact. For example, a spiral groove material configuration may induce backspin, which enhances the backspin produced by the club face. In some embodiments, the induced spin may be counter to, or off angle from, the spin generated by the club face. For example, in some embodiments, the spiral configuration may produce a rotation about the axis of ball flight (like an American football).

In addition to aerodynamic effects provided by groove material 335, ball 300 may be provided with other aerodynamic effects by other structural features. For example, in some embodiments, ball 300 may include dimples 375 on outer surface 340 of at least a portion of outer cover layer 325. Alternatively, or additionally, in some embodiments, ball 300 may have dimples in outer surface 350 of groove material 335 (not shown). Dimples 375 may have any suitable configuration. In some embodiments, dimples 375 may have an arrangement that is based on one or more dimple patterns known to those having ordinary skill in the art.

Figure 4:
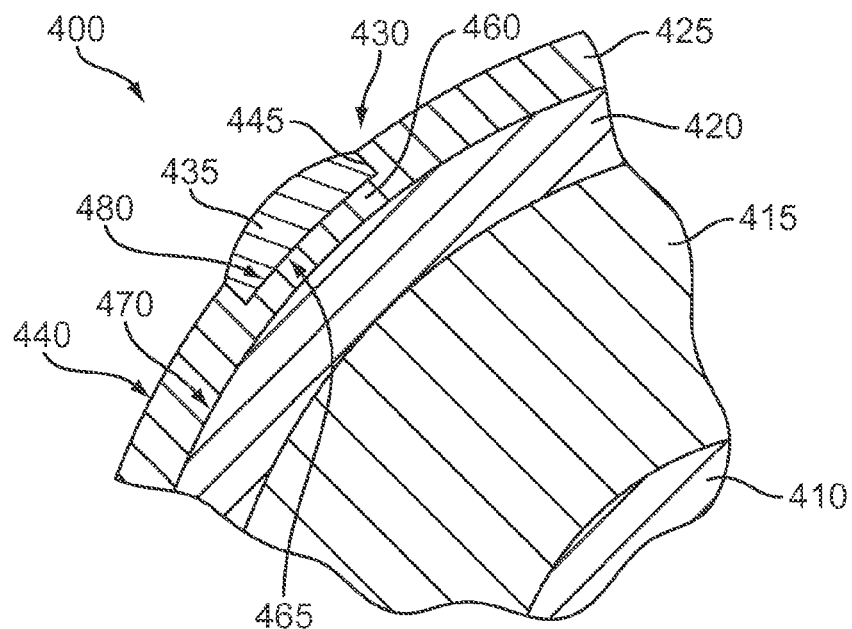
FIG. 4 shows a partial cross-sectional view of an exemplary alternative golf ball embodiment.

FIG. 4 shows an enlarged cross-sectional view of a portion of an exemplary golf ball having an alternative groove configuration. FIG. 4 illustrates an exemplary golf ball 400. Ball 400 may include an inner core layer 410 and an outer core layer 415 disposed radially outward of inner core layer 410. In addition, ball 400 may include an inner cover layer 420 disposed radially outward of outer core layer 415, and an outer cover layer 425 disposed radially outward of inner cover layer 420. These layers may be configured generally as discussed above with respect to FIGS. 1 and 2, as well as FIG. 3.

As shown in FIG. 4, outer cover layer 425 of ball 400 may include groove 430 extending radially inward from an outer surface 440 of outer cover layer 425. Ball 400 may also include a groove material 435 disposed within groove 430. Groove 430 may have any suitable configuration, such that the outer surface of groove material 435 may have any suitable shape, including for example, round, elongate, rectangular, oval, polygonal, or any other suitable shape. Groove material 435 may have performance characteristics, such as compressibility, that are the same or similar to those discussed above with respect to groove material 335.

Similar to the embodiment shown in FIG. 3, groove material 435 may be bulged beyond an outer surface 440 of outer cover layer 425, as shown in FIG. 4. Groove material 430 may be formed as a recess, such that a portion 460 of outer cover layer 425 may extend between an inner surface 465 of groove material 435 and an outer surface 470 of inner cover layer 420.

Groove 430 may have side walls 445. In some embodiments, side walls 445 may be angled with respect to outer surface 440 of outer cover layer 425. For example, as shown in FIG. 4, side walls 445 may be oriented substantially radially, that is, substantially perpendicular to outer surface 440. Other similar embodiments may implement side walls that are parallel to one another and, therefore, not precisely radial. Such radial and parallel configurations may provide durability under shear loads (loads on groove material 435 that are substantially tangential to the outer surface of the ball). Radially oriented side walls 440 may retain groove material 435 in groove 430 under shear loads by providing lateral support against groove material 435.

Also unlike groove 330 in FIG. 3, groove 430 may have a substantially planar bottom surface 480, as shown in FIG. 4. A planar bottom surface (as opposed to a curved bottom surface as shown in FIG. 3) may accommodate a larger amount of groove material, which may be desirable to provide increased spin and/or feel. Additionally, a planar bottom surface may be easier to manufacture, for example, via molding or machining.

Figure 5:
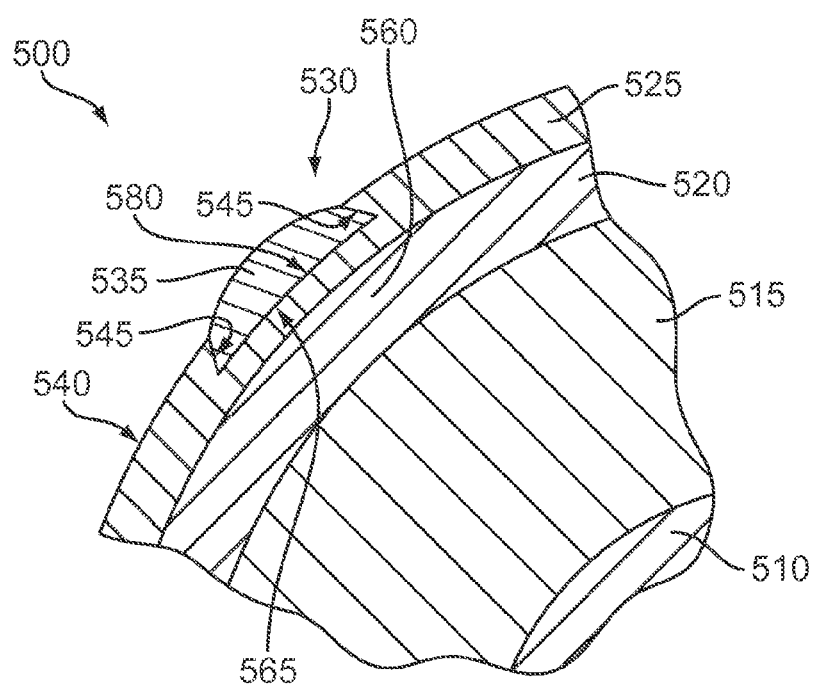
FIG. 5 shows a partial cross-sectional view of an exemplary alternative golf ball embodiment.

FIG. 5 illustrates a similar embodiment to that shown in FIG. 4. FIG. 5 shows a golf ball 500 having an inner core layer 510, an outer core layer 515, an inner cover layer 520, and an outer core layer 525. Ball 500 may also include a groove 530, and a groove material 535 disposed within groove 530. As shown in FIG. 5, groove material 535 may be bulged beyond an outer surface 540 of outer cover layer 525, and thus, may have an outward facing surface that is substantially similar to groove material 435 in FIG. 4.

As illustrated in FIG. 5, ball 500 may include side walls 545 that are angled with respect to outer surface 540 of outer cover layer 525. In some embodiments, opposing side walls 545 may be angled closer to one another near outer surface 540 of outer cover layer 525. Having side walls 545 angled in this manner may increase durability by providing additional retention of groove material 535 in groove 530 under loading.

As also illustrated in FIG. 5, an inner surface 565 of groove material 535 and mating bottom surface 580 of groove 530 may be curved in an arc about the center of ball 500. Accordingly, the thickness of the portion 560 of outer cover layer 525 may be consistent across substantially the entire groove 530. This may provide predictability regarding the structural properties of the assembly.

In some embodiments, grooves may extend completely through the outer cover layer of the golf ball. In some such embodiments, the inner surface of the groove material may be in contact with the outer surface of the inner cover layer. In other embodiments, a portion of an underlying, inner cover layer may extend radially outward into (and in some cases through) the groove to form the groove material. These configurations may provide still further increases in manufacturability and/or durability of the assembly.

Figure 6:
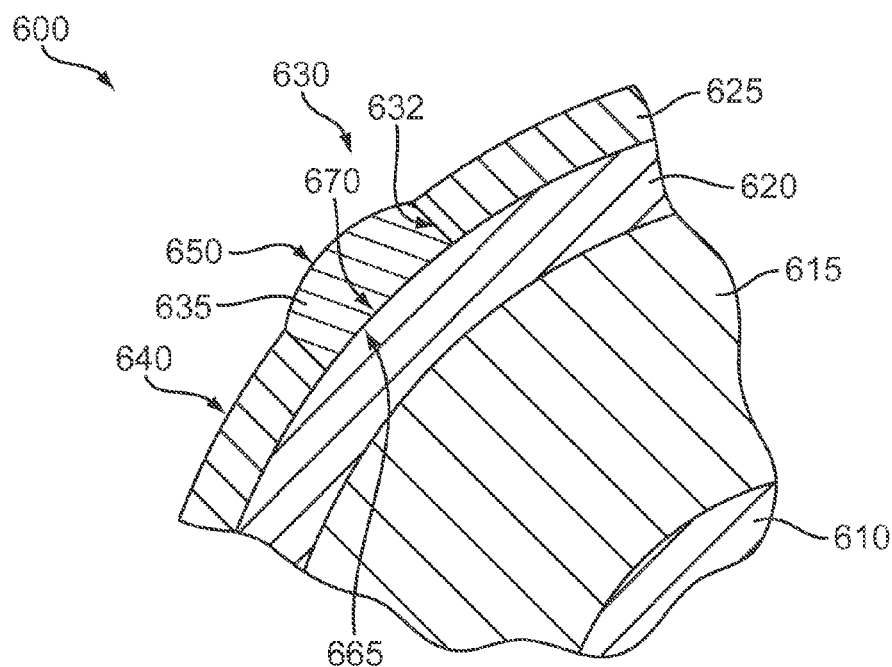
FIG. 6 shows a partial cross-sectional view of an exemplary alternative golf ball embodiment.

FIG. 6 is an enlarged, partial cross-sectional view of a golf ball having a bulged groove material disposed within a groove that extends completely through the outer cover of the ball. FIG. 6 shows a golf ball 600, having an inner core layer 610, an outer core layer 615, an inner cover layer 620, and an outer core layer 625. Ball 600 may also include a groove 630, and a groove material 635 disposed within groove 630. As shown in FIG. 6, an outer surface 650 of groove material 635 may extend radially outward beyond an outer surface 640 of outer cover layer 625. As illustrated in FIG. 6, groove 630 may extend completely through outer cover layer 625. Accordingly, an inner surface 665 of groove material 635 may be in contact with an outer surface 670 of inner cover layer 620.

Figure 7:
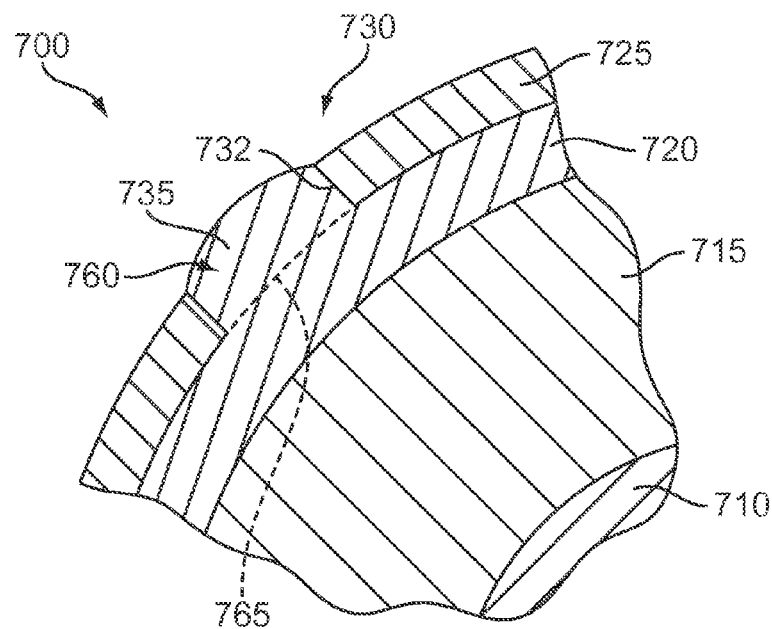
FIG. 7 shows a partial cross-sectional view of an exemplary alternative golf ball embodiment.

FIG. 7 illustrates an enlarged, partial cross-sectional view of another golf ball embodiment featuring a bulging groove material disposed within a groove that extends completely through the outer cover layer. FIG. 7 shows a golf ball 700, having an inner core layer 710, an outer core layer 715, an inner cover layer 720, and an outer core layer 725. Ball 700 may also include a groove 730, and a groove material 735 disposed within groove 730. As shown in FIG. 7, in some embodiments, groove material 735 may be formed by a portion 760 of the inner cover layer material that extends radially outward into groove 730. For purposes of illustration, FIG. 7 includes a dashed line 765 to delineate a boundary between inner cover layer 720 and groove material 735.

In some embodiments, groove material may be recessed from the outer surface of the outer cover layer. In some such embodiments, the outer cover layer may be formed of a more compressible material than the groove material. This configuration may operate on similar principles to embodiments, wherein a bulging groove material is more compressible than an outer cover layer into which it is molded. In some embodiments, this may provide a larger surface area of the ball formed of the more compressible material. Thus, such an embodiment could be implemented to provide even greater amounts of spin and/or feel.

In some embodiments, recessed groove material may be formed of a material that is more compressible than the outer cover layer. Such configurations may be implemented to provide a golf ball with a more durable outer surface. In a recessed groove material embodiment, contact between the outer surface of the groove material with clubs and the ground may be limited. By having a less compressible, and possibly harder, material disposed further radially outward than the more compressible groove material, and thus, exposed to more contact with the clubs and the ground, a more durable material may be subjected to a substantial majority of the abuse.

In addition to the benefits (discussed above) of adding a compressible material in the cover region of a golf ball having a recessed groove material, the recesses in the grooves may also provide an aerodynamic effect. As discussed above regarding the embodiment shown in FIG. 3, like bulged groove material, recesses in grooves may provide disruption of airflow at boundary layers (similar to dimples). Also like bulged groove material, recesses in grooves may be arranged to provide other aerodynamic effects, such as by inducing spin.

Figure 8:
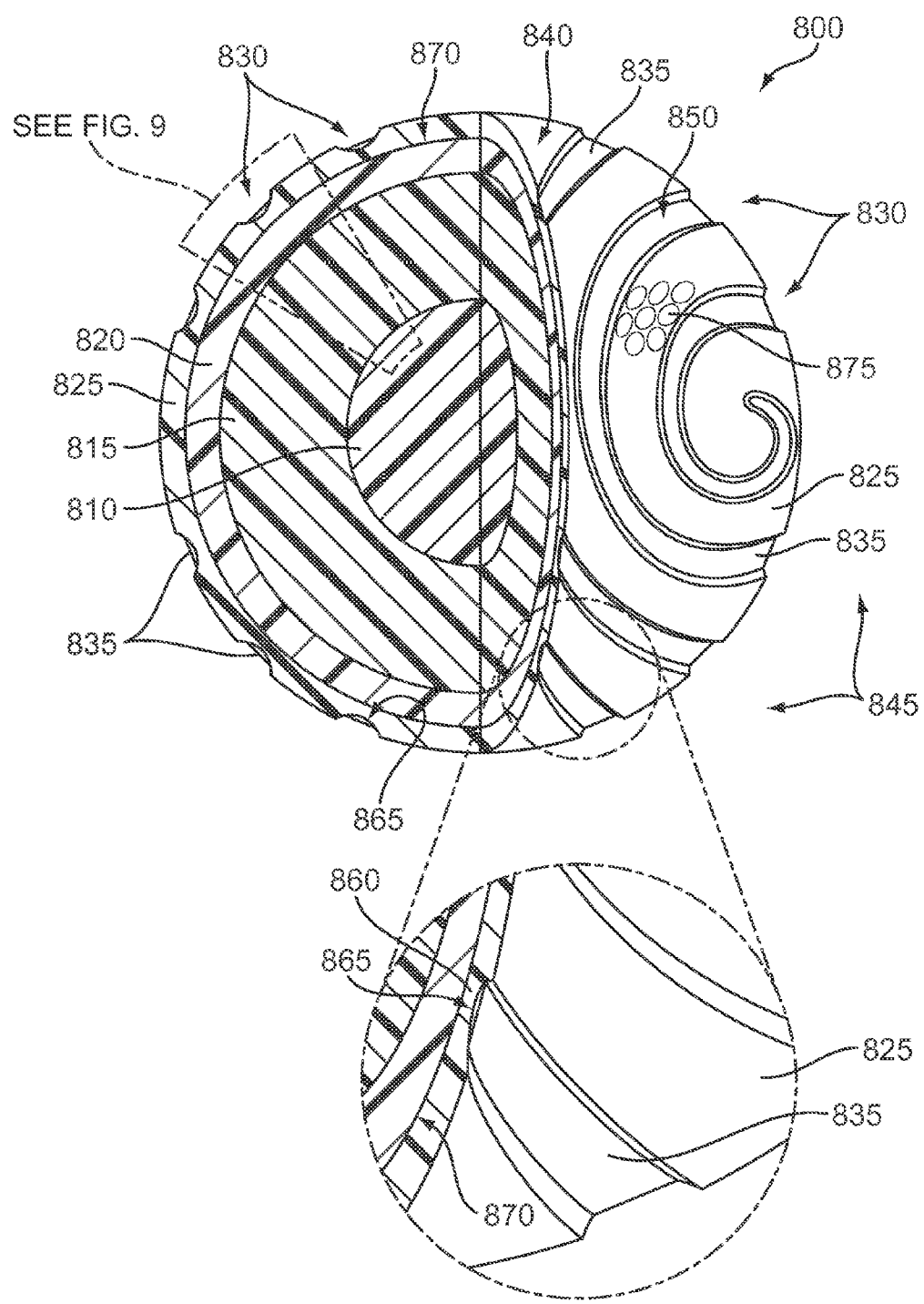
FIG. 8 shows a cutaway, partial cross-sectional view of an alternative golf ball embodiment having material-filled spiral grooves in an outer layer.

FIG. 8 illustrates an exemplary embodiment including a recessed groove material. FIG. 8 shows a golf ball 800, having an inner core layer 810, an outer core layer 815, an inner cover layer 820, and an outer core layer 825. Ball 800 may also include a groove 830, and a groove material 835 disposed within groove 830. As shown in FIG. 8, in some embodiments, an outer surface 850 of groove material 835 may be recessed from an outer surface 840 of outer cover layer 825.

Groove material 835 may have a compressibility, and/or hardness, that are different than outer cover layer 825. In some embodiments, outer cover layer 825 may be more compressible than groove material 835. In other embodiments, groove material 835 may be more compressible than outer cover layer 825. In determining whether to utilize a more compressible material for outer cover layer 825 or for groove material 835, a ball designer may consider, as a factor, the desirability of performance characteristics provided by a more compressible material (e.g., spin, feel, control), and performance characteristics provided by a less compressible material (e.g., distance, durability). In order to achieve more compressible material characteristics, the more compressible material may be used to form outer cover layer 825, which generally makes more contact with the club face. In order to achieve more incompressible material characteristics, the less compressible material may be used to form outer cover layer 825.

Performance characteristics may also be determined by the relative surface areas of outer cover layer 825 and groove material 835 that make up the overall outer surface 845 of ball 800. For example, although a more compressible material may be utilized for recessed groove material 835, the ball may be provided with more compressible material characteristics by making grooves 830 wider and providing a higher ratio of groove material surface area to outer cover layer surface area.

Figure 9:
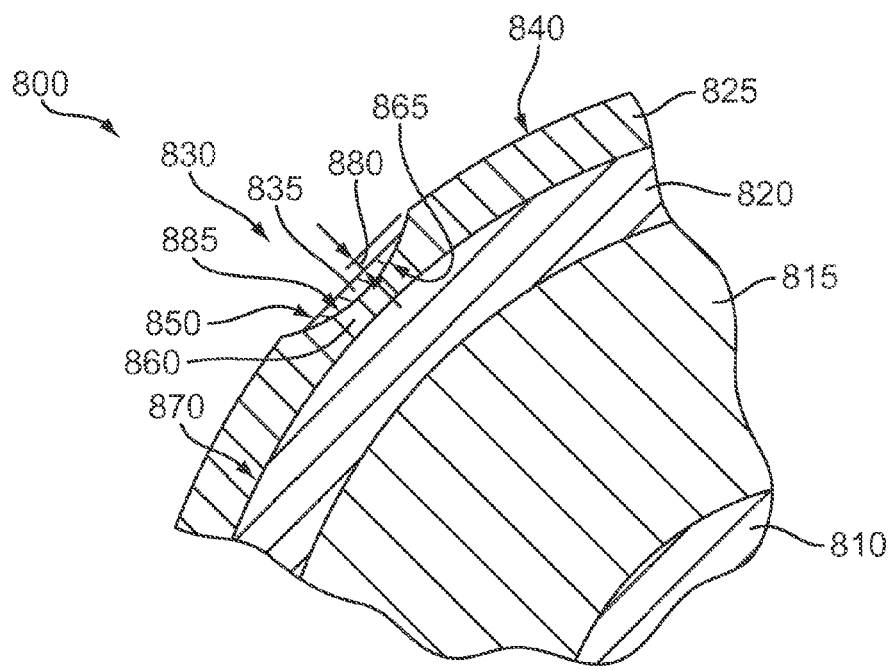
FIG. 9 shows a partial cross-sectional view of an exemplary alternative golf ball embodiment.

Groove 830 may have any suitable shape. As shown in FIG. 8, groove 830 may be arranged in a spiral configuration similar to groove 330 in FIG. 3. In addition, groove 830 may have any suitable cross-sectional shape. FIG. 9 is an enlarged view of a portion of ball 800, showing an exemplary cross-sectional shape of groove 830. As shown in FIG. 9, in some embodiments, groove 830 may have a curved bottom surface 885. As further illustrated in FIG. 9, groove 830 may be formed as a recess in outer cover layer 825. Therefore, a portion 860 of outer cover layer 825 may extend between an inner surface 865 of groove material 835 and an outer surface 870 of inner cover layer 820. As can also be seen in FIG. 9, an outer surface 850 of groove material 835 may be recessed from outer surface 840, as illustrated by a dimension 880.

Golf ball 800 may also include other surface features. For example, in some embodiments, ball 800 may include dimples 875 on at least a portion of outer surface 840 of outer cover layer 825 or in other portions of golf ball 800.

Figure 10:
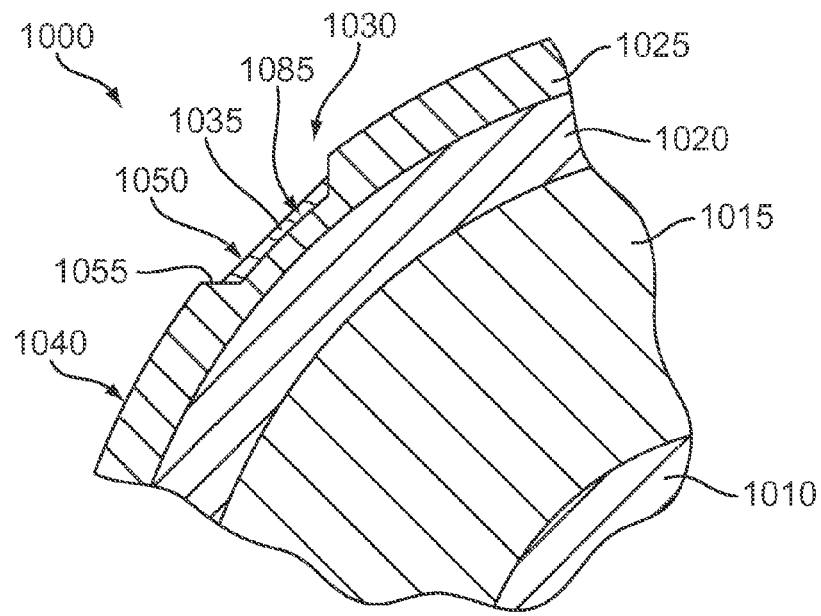
FIG. 10 shows a partial cross-sectional view of an exemplary alternative golf ball embodiment.
Figure 11:
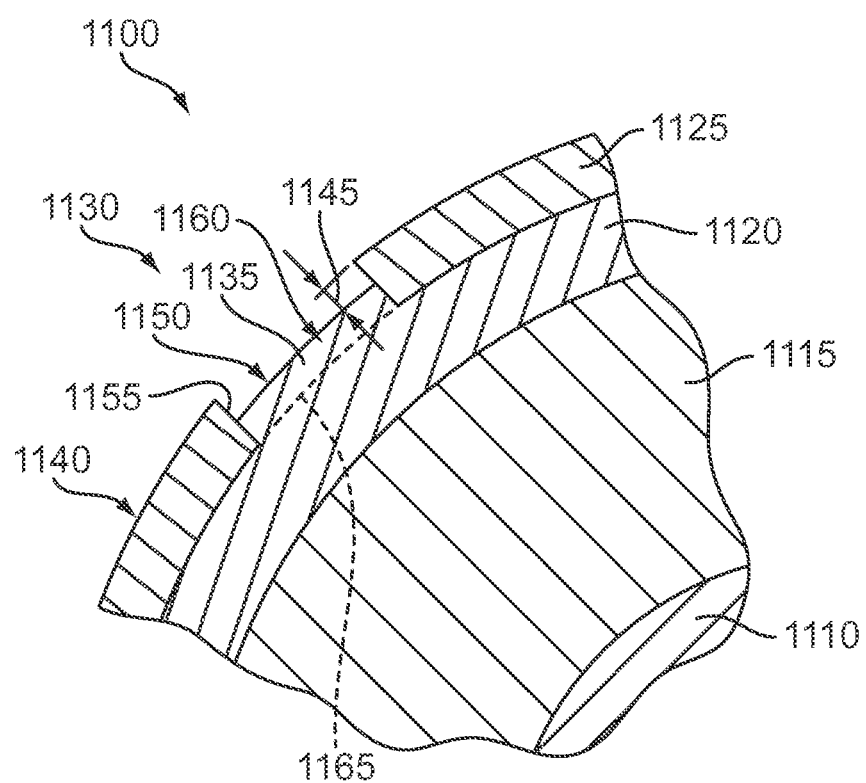
FIG. 11 shows a partial cross-sectional view of an exemplary alternative golf ball embodiment.

FIGS. 10 and 11 show enlarged, cross-sectional views of exemplary alternative groove configurations having recessed groove material. FIG. 10 illustrates an embodiment wherein the groove has beveled or angled side walls. FIG. 10 shows a golf ball 1000, having an inner core layer 1010, an outer core layer 1015, an inner cover layer 1020, and an outer core layer 1025. Ball 1000 may also include a groove 1030, and a groove material 1035 disposed within groove 1030. As shown in FIG. 10, in some embodiments, an outer surface 1050 of groove material 1035 may be recessed from an outer surface 1040 of outer cover layer 1025.

In some embodiments, groove 1030 may have sidewalls 1055 that are angled relative to outer surface 1040 of outer cover layer 1025. In some embodiments, opposing sidewalls 1055 may be angled farther away from one another at outer surface 1040 of outer cover layer 1025, as shown in FIG. 10. In some embodiments, a bottom surface 1085 of groove 1030 may be curved about the center of ball 1000, as also shown in FIG. 10.

FIG. 11 illustrates an embodiment wherein the groove extends completely through the outer cover layer. FIG. 11 shows a golf ball 1100, having an inner core layer 1110, an outer core layer 1115, an inner cover layer 1120, and an outer core layer 1125. Ball 1100 may also include a groove 1130, and a groove material 1135 disposed within groove 1130. As shown in FIG. 11, in some embodiments, an outer surface 1150 of groove material 1135 may be recessed from an outer surface 1140 of outer cover layer 1125. This is illustrated by a dimension 1145. Outer surface 1150 of groove material 1135 is illustrated as being curved about the center of ball 1100. However, it may also be possible for outer surface 1150 to be substantially planar.

As shown in FIG. 11, in some embodiments, groove 1130 may be defined by side walls 1155 and may extend completely through outer cover layer 1125. Also, in some embodiments, groove material 1135 may be formed by a portion 1160 of inner cover layer material that extends radially outward into groove 1130. A dashed line 1165 illustrates a boundary between inner cover layer 1125 and portion 1160 forming groove material 1135.

Figure 12:
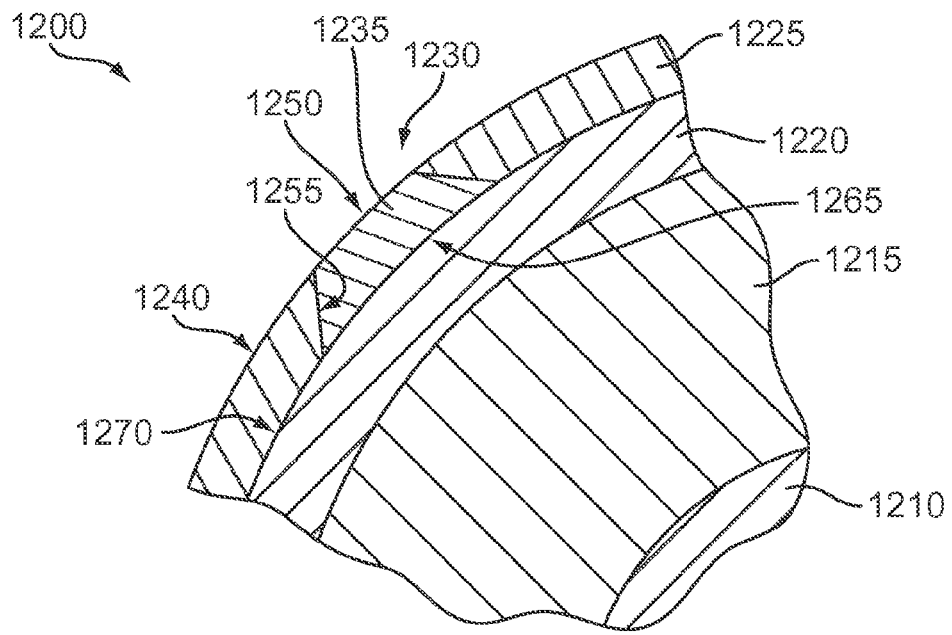
FIG. 12 shows a partial cross-sectional view of an exemplary alternative golf ball embodiment.
Figure 13:
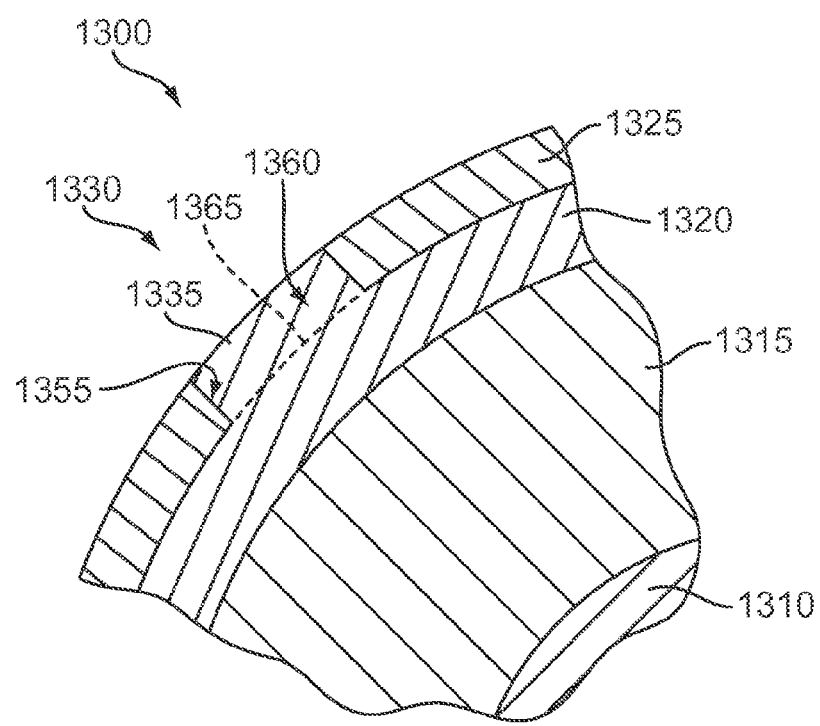
FIG. 13 shows a partial cross-sectional view of an exemplary alternative golf ball embodiment.

FIGS. 12 and 13 illustrate enlarged, cross-sectional views of exemplary groove configurations, wherein the groove material is substantially flush with the outer surface of the outer cover layer. The benefits and considerations of having groove material bulging or recessed are discussed above. The same considerations are also relevant to flush embodiments. In some cases, having flush groove material may provide a suitable compromise between bulged and recessed groove material configurations. Flush embodiments may also be easier to manufacture, and may produce a golf ball that appears to have a more traditional outer surface shape.

FIG. 12 shows a golf ball 1200, having an inner core layer 1210, an outer core layer 1215, an inner cover layer 1220, and an outer core layer 1225. Ball 1200 may also include a groove 1230, and a groove material 1235 disposed within groove 1230. As shown in FIG. 12, in some embodiments, an outer surface 1250 of groove material 1235 may be substantially flush with an outer surface 1240 of outer cover layer 1225. In addition, groove 1230 may include angled side walls 1255.

As also shown in FIG. 12, in some embodiments, groove 1230 may extend completely through outer cover layer 1225. Accordingly, an inner surface 1265 of groove material 1235 may be in contact with an outer surface 1270 of inner cover layer 1220.

FIG. 13 shows a golf ball 1300, having an inner core layer 1310, an outer core layer 1315, an inner cover layer 1320, and an outer core layer 1325. Ball 1300 may also include a groove 1330, and a groove material 1335 disposed within groove 1330. As illustrated in FIG. 13, in some embodiments, groove 1330 may be defined by side walls 1355 and may extend completely through outer cover layer 1325. In addition, in some embodiments, groove material 1335 may be formed by a portion 1360 of inner cover layer material that extends radially outward from the center of ball 1300. Portion 1360 is generally delineated by a dashed line 1365 in FIG. 13.

Figure 14:
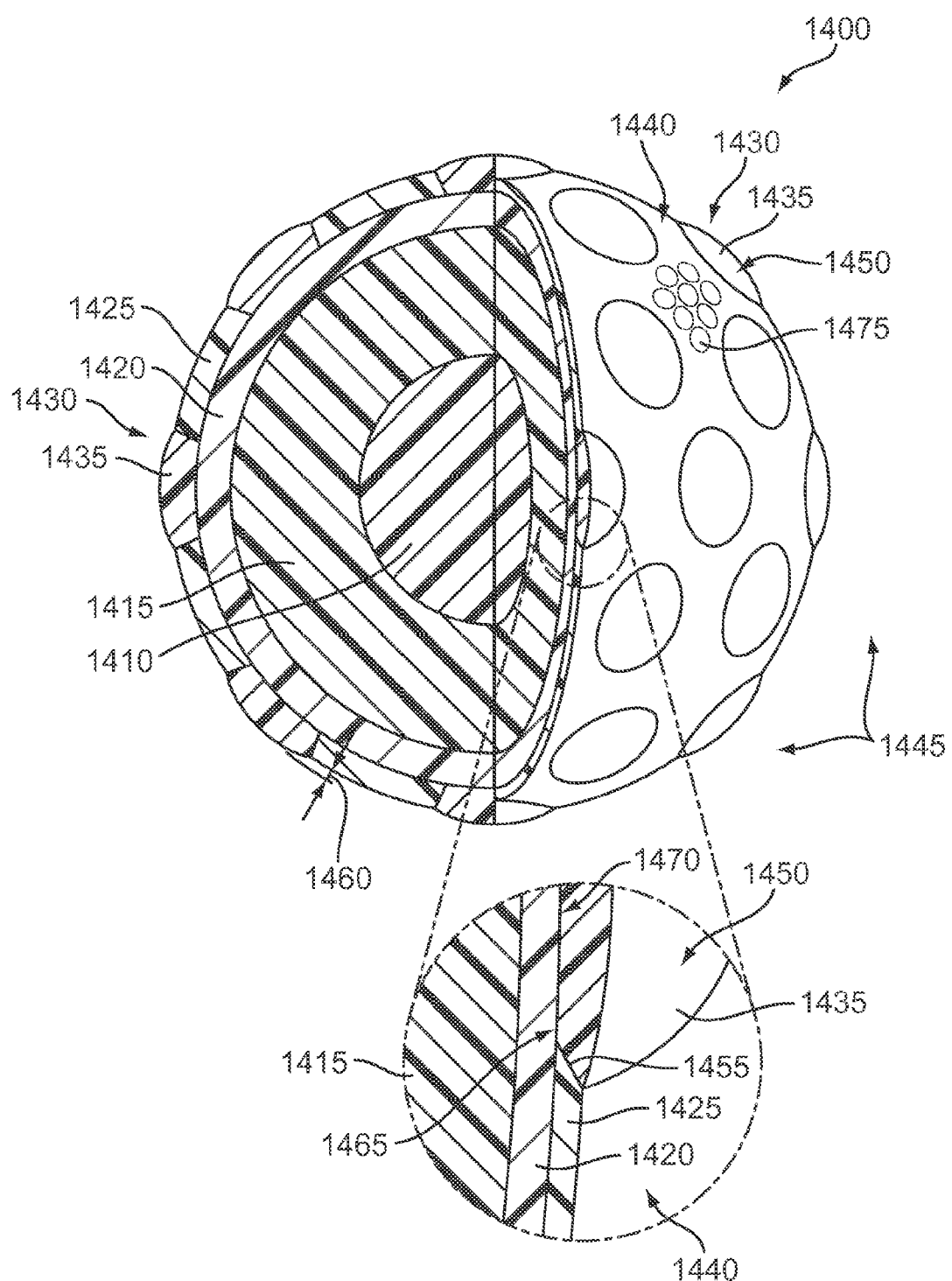
FIG. 14 shows a cutaway, partial cross-sectional view of an exemplary golf ball having material-filled, circular grooves in an outer layer.

FIG. 14 illustrates an alternative embodiment having bulged groove material. FIG. 14 shows a golf ball 1400, having an inner core layer 1410, an outer core layer 1415, an inner cover layer 1420, and an outer core layer 1425. Ball 1400 may also include a groove 1430, and a groove material 1435 disposed within groove 1430.

As shown in FIG. 14, in some embodiments, grooves 1430 (and the bulging groove material 1435 associated with each groove 1430) may be substantially circular. It will be understood that grooves 1430 may have any other suitable shape, such as squares, rectangles, triangles, and any other suitable shape.

Outer surfaces 1440 of outer cover layer 1425 and outer surfaces 1450 of groove material 1435 may constitute an outer surface 1445 of ball 1400. The size of grooves 1430 may vary and, accordingly, the ratio of surface area between outer surface 1440 and outer surface 1450 may also be varied to provide the desired performance characteristics.

Groove material 1435 may bulge beyond outer surface 1440 as indicated by a dimension 1460. In addition, grooves 1430 may include side walls 1455 that are angled with respect to outer surface 1440 of outer cover layer 1425.

As shown in FIG. 14, in some embodiments, grooves 1430 may extend completely through outer cover layer 1425. Accordingly, an inner surface 1465 of groove material 1435 may be in contact with an outer surface 1470 of inner cover layer 1420.

Golf ball 1400 may also include other surface features. For example, in some embodiments, ball 1400 may include dimples 1475 on at least a portion of outer surface 1440 of outer cover layer 1425 or in other portions of golf ball 1400.

Figure 15:
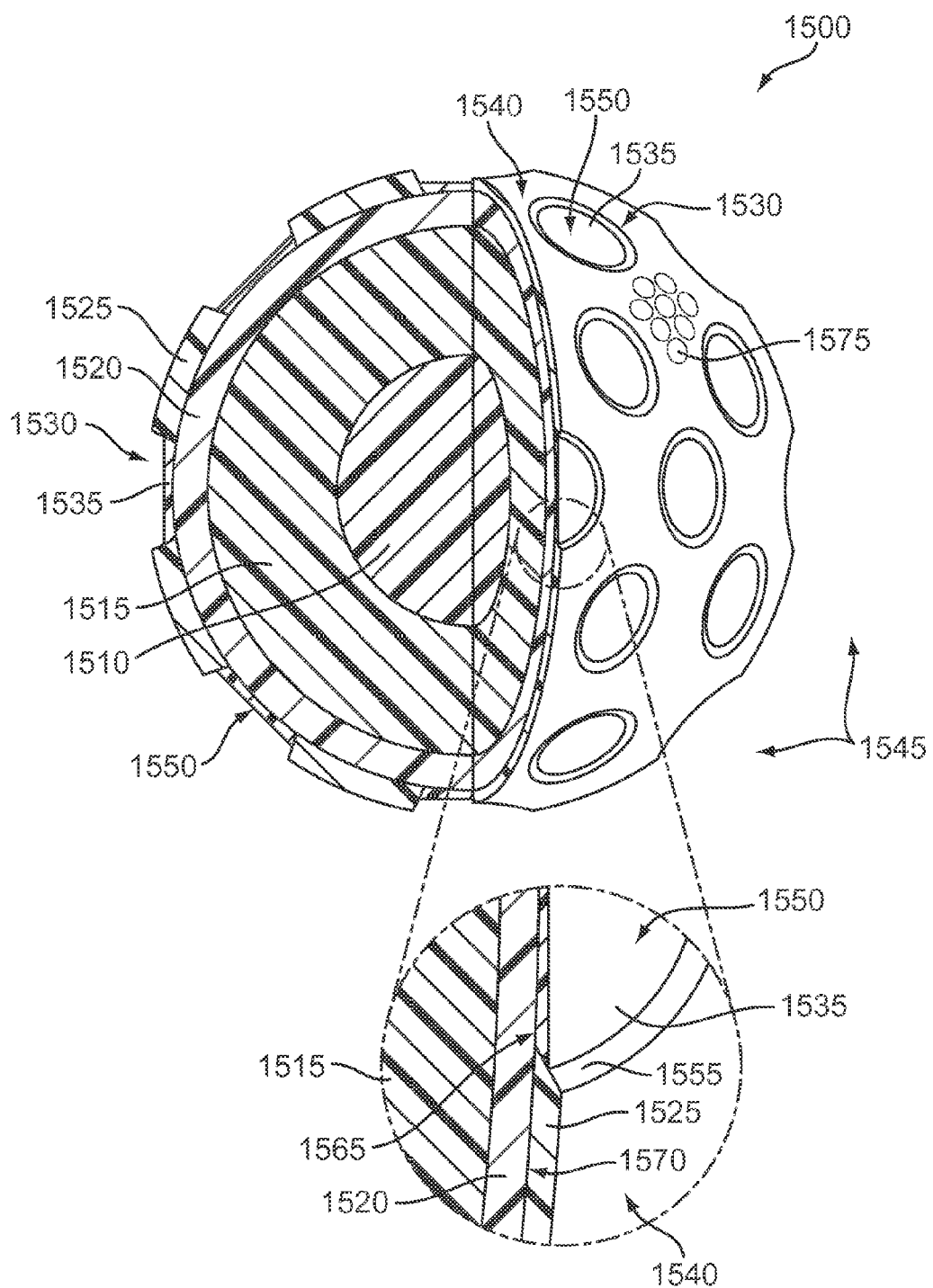
FIG. 15 shows a cutaway, partial cross-sectional view of an alternative golf ball embodiment having material-filled, circular grooves in an outer layer.

FIG. 15 illustrates a golf ball embodiment similar to ball 1400, but having recessed groove material. FIG. 15 shows a golf ball 1500, having an inner core layer 1510, an outer core layer 1515, an inner cover layer 1520, and an outer core layer 1525. Ball 1500 may also include a groove 1530, and a groove material 1535 disposed within groove 1530.

As shown in FIG. 15, in some embodiments, grooves 1530 (and the groove material 1535 associated with each groove 1530) may be substantially circular. It will be understood that grooves 1530 may have any other suitable shape, such as squares, rectangles, triangles, and any other suitable shape.

Outer surfaces 1540 of outer cover layer 1525 and outer surfaces 1550 of groove material 1535 may constitute an outer surface 1545 of ball 1500. The size of grooves 1530 may vary and, accordingly, the ratio of surface area between outer surface 1540 and outer surface 1550 may also be varied to provide the desired performance characteristics.

Outer surface 1550 of groove material 1535 may be recessed from outer surface 1540. In some embodiments, outer surfaces 1550 of groove material 1535 may be substantially planar, as shown in FIG. 15. In other embodiments, outer surfaces 1550 may curve about the center of ball 1500. In addition, grooves 1530 may include side walls 1555 that are angled with respect to outer surface 1540 of outer cover layer 1525.

As shown in FIG. 15, in some embodiments, grooves 1530 may extend completely through outer cover layer 1525. Accordingly, an inner surface 1565 of groove material 1535 may be in contact with an outer surface 1570 of inner cover layer 1520.

Golf ball 1500 may also include other surface features. For example, in some embodiments, ball 1500 may include dimples 1575 on at least a portion of outer surface 1540 of outer cover layer 1525 or in other portions of golf ball 1500.

Figure 16:
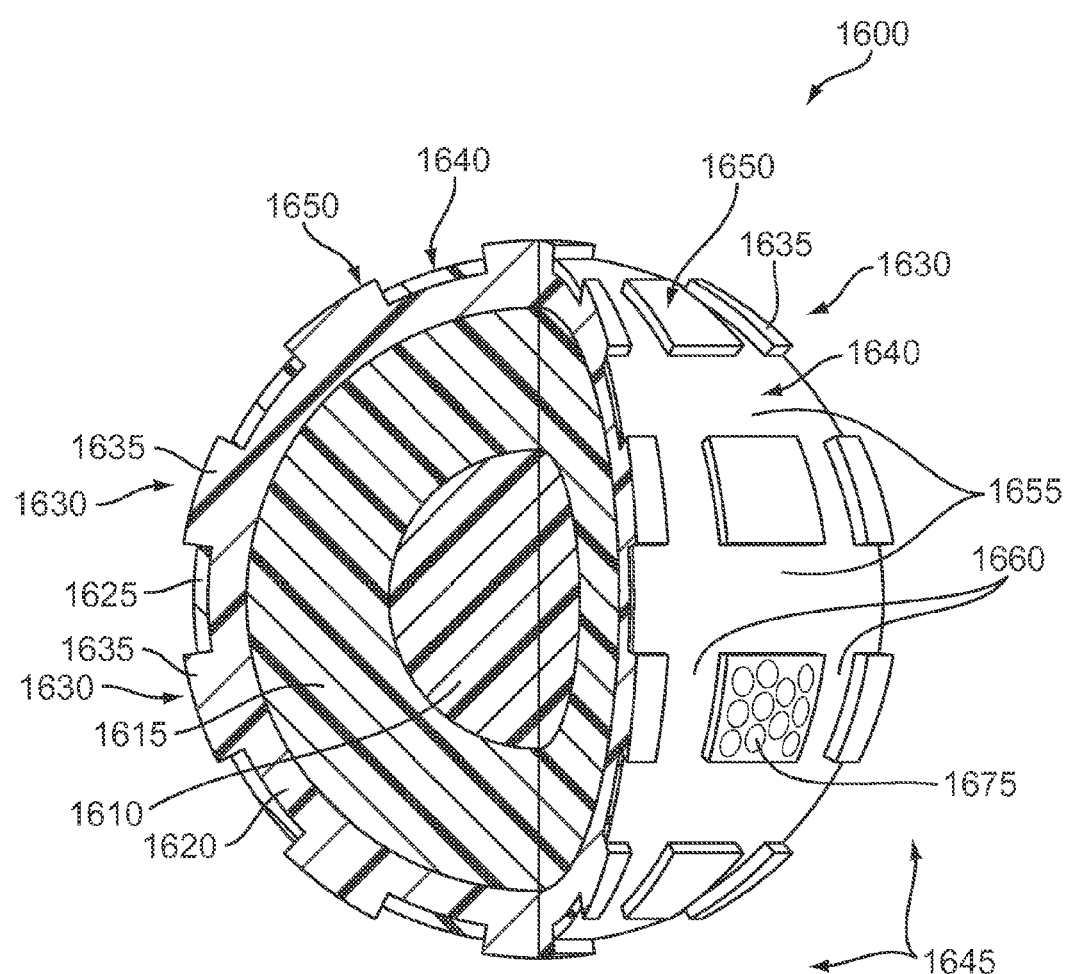
FIG. 16 shows a cutaway, partial cross-sectional view of an exemplary golf ball having a material-filled recessed grid in an outer layer.

FIG. 16 illustrates an alternative embodiment wherein the outer cover layer is formed as a grid defining grooves between the gridlines. FIG. 16 shows a golf ball 1600, having an inner core layer 1610, an outer core layer 1616, an inner cover layer 1620, and an outer core layer 1625. Ball 1600 may also include a groove 1630, and a groove material 1635 disposed within groove 1630.

As shown in FIG. 16, an outer surface 1640 of outer cover layer 1625 and an outer surface 1650 of groove material 1635 may form the overall outer surface 1645 of ball 1600. In some embodiments, outer surface 1650 of groove material 1635 may extend beyond outer surface 1640 of outer cover layer 1625. This configuration may operate on similar principles to the bulged groove material embodiments discussed above.

In some embodiments, outer cover layer 1625 may be formed as a grid, wherein the gridlines of the grid are formed by intersecting bands of material. For example, a first set of bands 1655 may intersect with a second set of bands 1660. Grid bands 1655 and 1660 may have any suitable configuration and orientation. As shown in FIG. 16, grid bands 1655 may be oriented as latitudinal gridlines. In other embodiments, grid bands 1655 may be oriented differently, such as longitudinally. Also, as shown in FIG. 16, grid bands 1660 may be oriented longitudinally. In other embodiments, grid bands 1660 may be oriented differently, such as latitudinal.

The openings in the outer cover layer grid may define grooves 1630. In some embodiments, as shown in FIG. 16, groove material 1635 may be formed by portions of inner cover layer 1620 that extend radially outward into grooves 1630.

In some embodiments, groove material 1635 may be more compressible than outer cover layer 1625. In other embodiments, groove material 1635 may be less compressible than outer cover layer 1625. The advantages of each such configuration are discussed above in conjunction with other similar embodiments.

Golf ball 1600 may also include other surface features. For example, in some embodiments, ball 1600 may include dimples 1675 on at least a portion of outer surface 1640 of outer cover layer 1625 or in other portions of golf ball 1600.

Methods of Making Golf Balls

The disclosed golf ball embodiments may be manufactured in several different ways. The following discussion provides details regarding exemplary processes for making certain disclosed embodiments. Many of the provided details apply generally for making golf balls having grooves and groove material.

The layers of a golf ball may be made using any of a number of molding processes, such as injection molding and compression molding. In some embodiments, outer layers may be molded on top of pre-molded inner layers. In some embodiments, an inner layer may be injection molded within a pre-molded outer shell.

In addition, pre-formed inner and/or outer layers may be supported during the process of co-molding an adjacent layer using a plurality of support pins. In some embodiments, the support pins may be a retractable part of the mold apparatus. In some embodiments, the support pins may be extensions of the pre-molded layer. For example, in some embodiments, support mold pins may be formed as part of a core layer and may meld with inner cover layer material during injection of the inner cover layer material. In such embodiments, the support pins may be formed of a material that is readily compatible with the material of the layer to be added. This compatibility may prevent or inhibit the formation of voids and/or delamination at the pin sites.

Use of support pins in molding processes are well-known in the art and, accordingly, one of ordinary skill would readily recognize support pin configurations that may be suitable for use in the methods described below.

An exemplary method of making a golf ball according to the present disclosure may include molding at least one core layer. In some embodiments the method may include molding multiple core layers, such as an inner core layer and an outer core layer. The formation of these core layers may be accomplished by injection molding and/or compression molding. Various techniques for forming golf ball core layers will be readily recognized by those having ordinary skill in the art.

In addition, the method may also include molding an outer cover layer radially outward of the core layer. The molding of this outer cover layer may be performed using injection molding or compression molding. In some embodiments, the method may include formation of an inner cover layer radially inward of the outer cover layer. In some embodiments, the inner cover layer may be formed first, and the outer cover layer may be molded afterward. In other embodiments, the outer cover layer may be pre-molded as a shell and then the inner cover layer may be injection molded under the pre-molded shell between the outer cover layer and the core layers. In some embodiments, the shell may be formed as two hemispherical shells, in order to enable a pre-molded core to be placed inside the shell before injecting the inner cover layer material.

Figure 17:
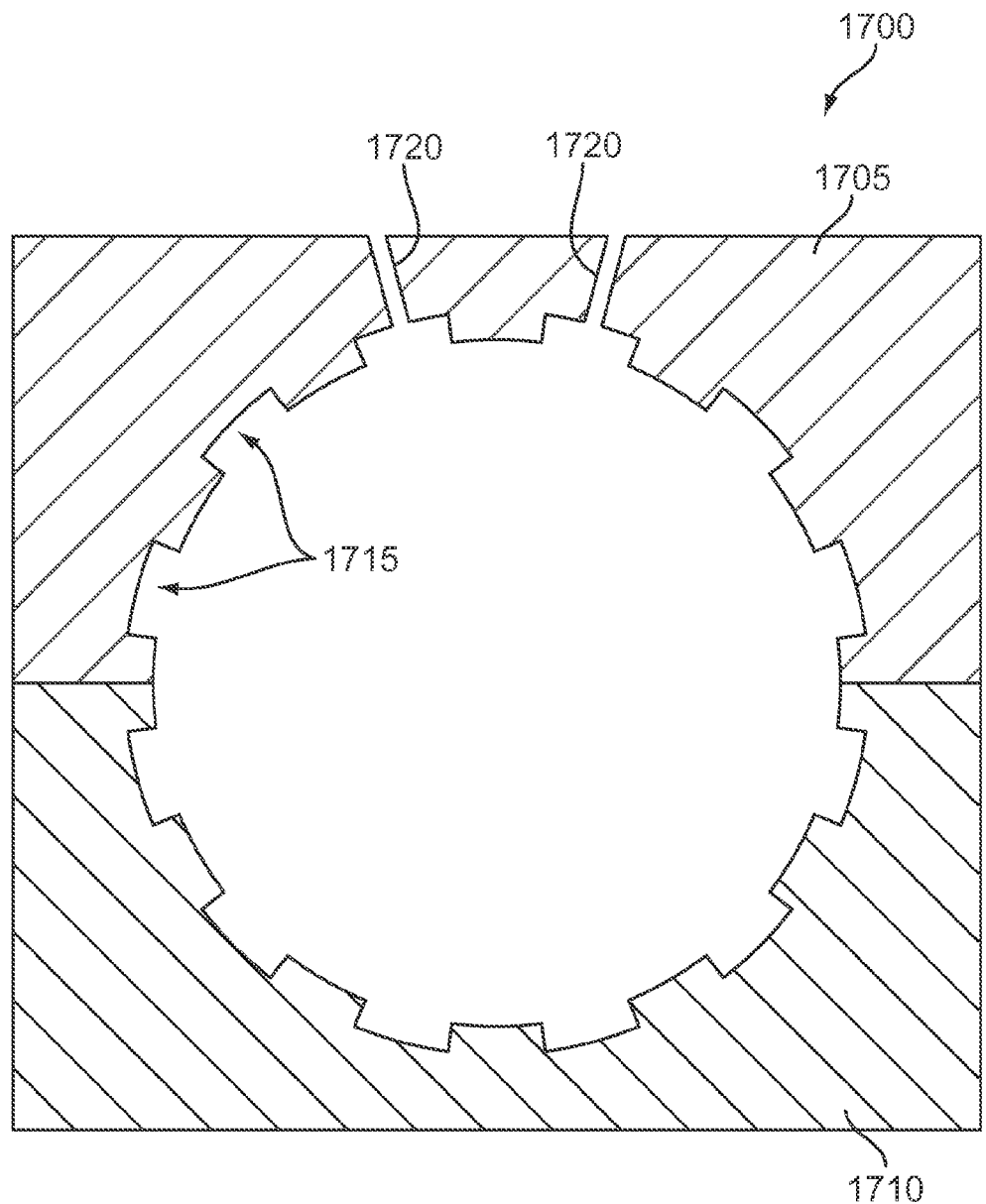
FIG. 17 shows a cross-sectional view of a mold for a golf ball.
Figure 18:
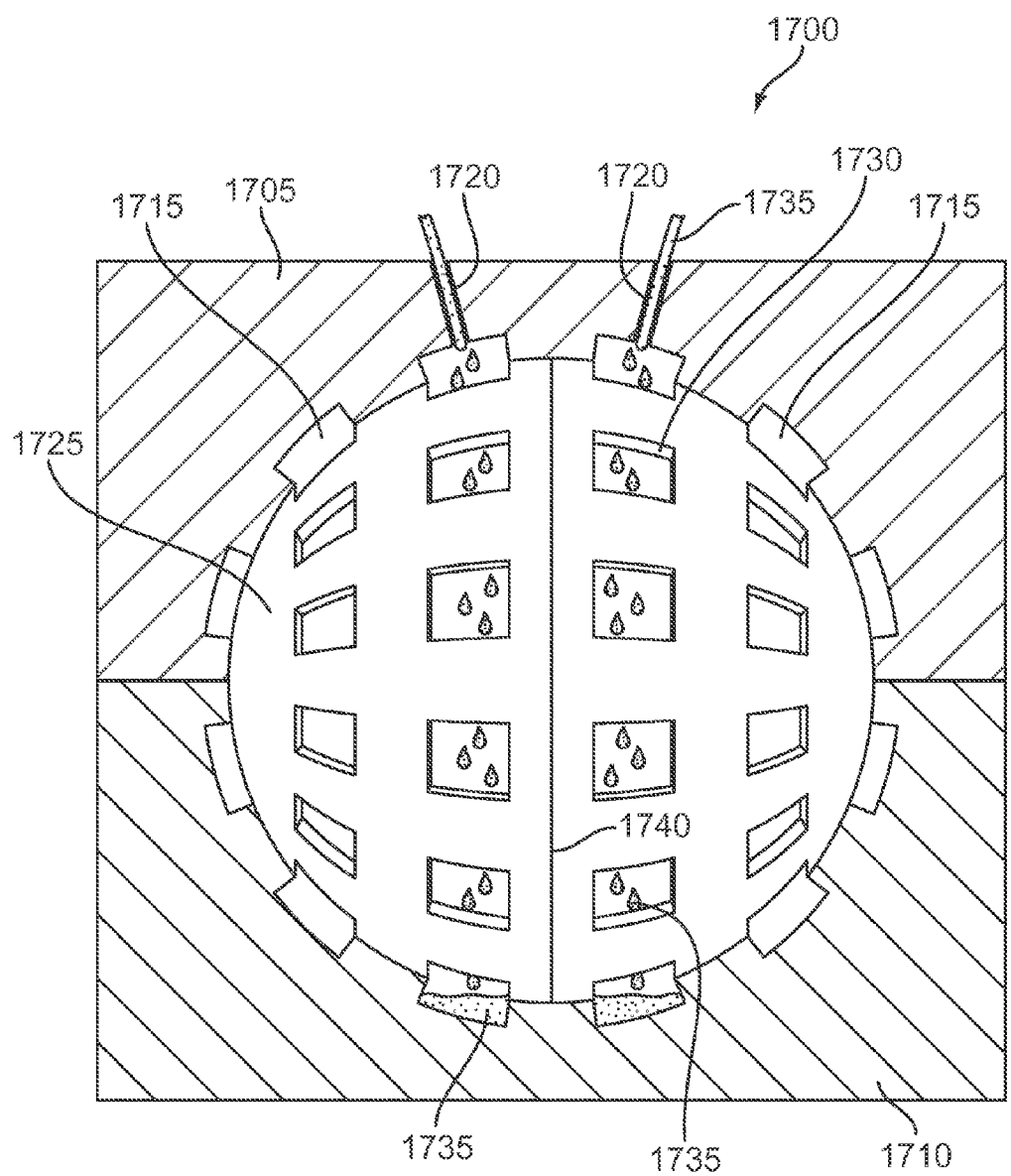
FIG. 18 shows a partial cross-sectional view of an apparatus and method for molding components of a golf ball.

FIGS. 17 and 18 illustrate an apparatus and method for molding a golf ball according to the embodiment shown in FIG. 16, wherein an inner cover layer is injection molded under and through a pre-formed, grid-like outer cover layer. FIG. 17 shows a cross-sectional view of a mold 1700, including a first mold section 1705 and a second mold section 1710. Mold 1700 may be used for injection molding groove material within a pre-formed grid-type shell. Accordingly, mold 1700 may include recesses 1715 which may be configured to receive injected groove material about a periphery of a pre-formed outer cover layer shell. Mold 1700 may also include one or more injection gates 1720 for injecting groove material into mold 1700.

FIG. 18 illustrates mold 1700 with an outer cover layer shell 1725 placed inside. As shown in FIG. 18, shell 1725 may be formed as two hemispherical half-shells, as indicated by an equator line 1740. In an exemplary method, the hemispherical half-shells may be snapped together about, or otherwise placed around one or more inner core layers (not shown) and then placed in mold 1700, as shown in FIG. 18. It will be noted that, for purposes of illustration, mold 1700 is shown in cross-section, whereas shell 1725 is shown in an elevation view.

The method may further include injecting a groove material 1735 through gates 1720 into the cavity within mold 1700 where it may flow into the void under shell 1725. Groove material 1735 may further flow radially outward through grooves 1730 (which may be formed completely through outer cover layer shell 1725), into recesses 1715. Molding groove material 1735 in this manner may form the groove material from portions of inner cover layer material that extend radially outward into grooves 1730.

As noted above, the groove material 1735 may be formed of a more or less compressible material than outer cover layer shell 1725.

Processes for injection molding material under pre-molded outer layers that may be applicable to the present disclosure are discussed in detail in U.S. Ser. No. 61/580,549, filed on Dec. 27, 2011, and entitled "Golf Ball with Co-Molded Core and Medial Layer and Method of Making;" U.S. Ser. No. 61/580,537, filed on Dec. 27, 2011, and entitled "Method of Molding a Single-Piece Hollow Shell Including Perforations;" and U.S. Ser. No. 61/580,525, filed on Dec. 27, 2011, and entitled "Method of Recycling a Ball and Ball for Use in Recycling Method," all of which are hereby incorporated herein by reference in their entirety.

Figure 19:
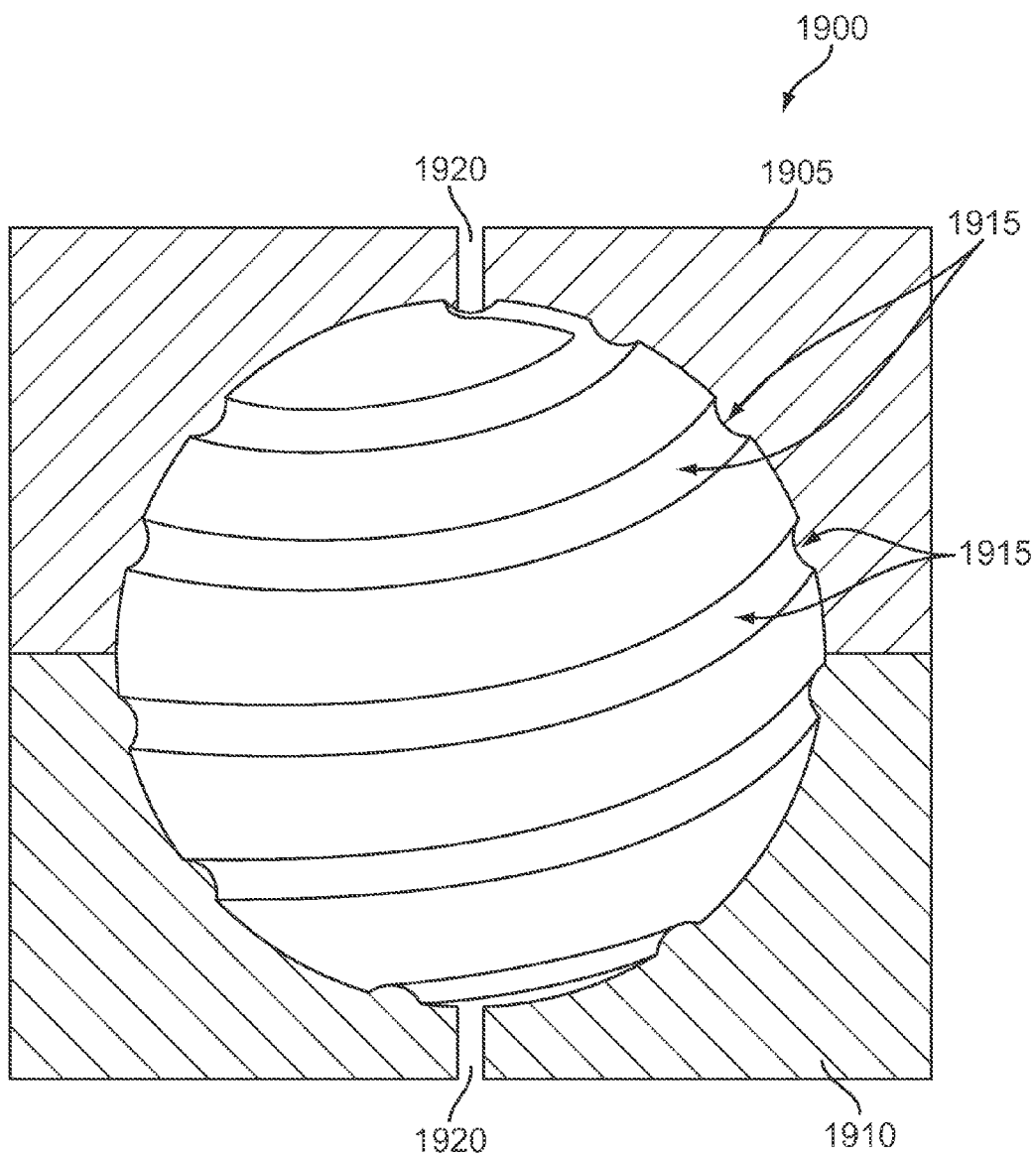
FIG. 19 shows a partial cross-sectional view of a mold for an outer cover layer of a golf ball.
Figure 20:
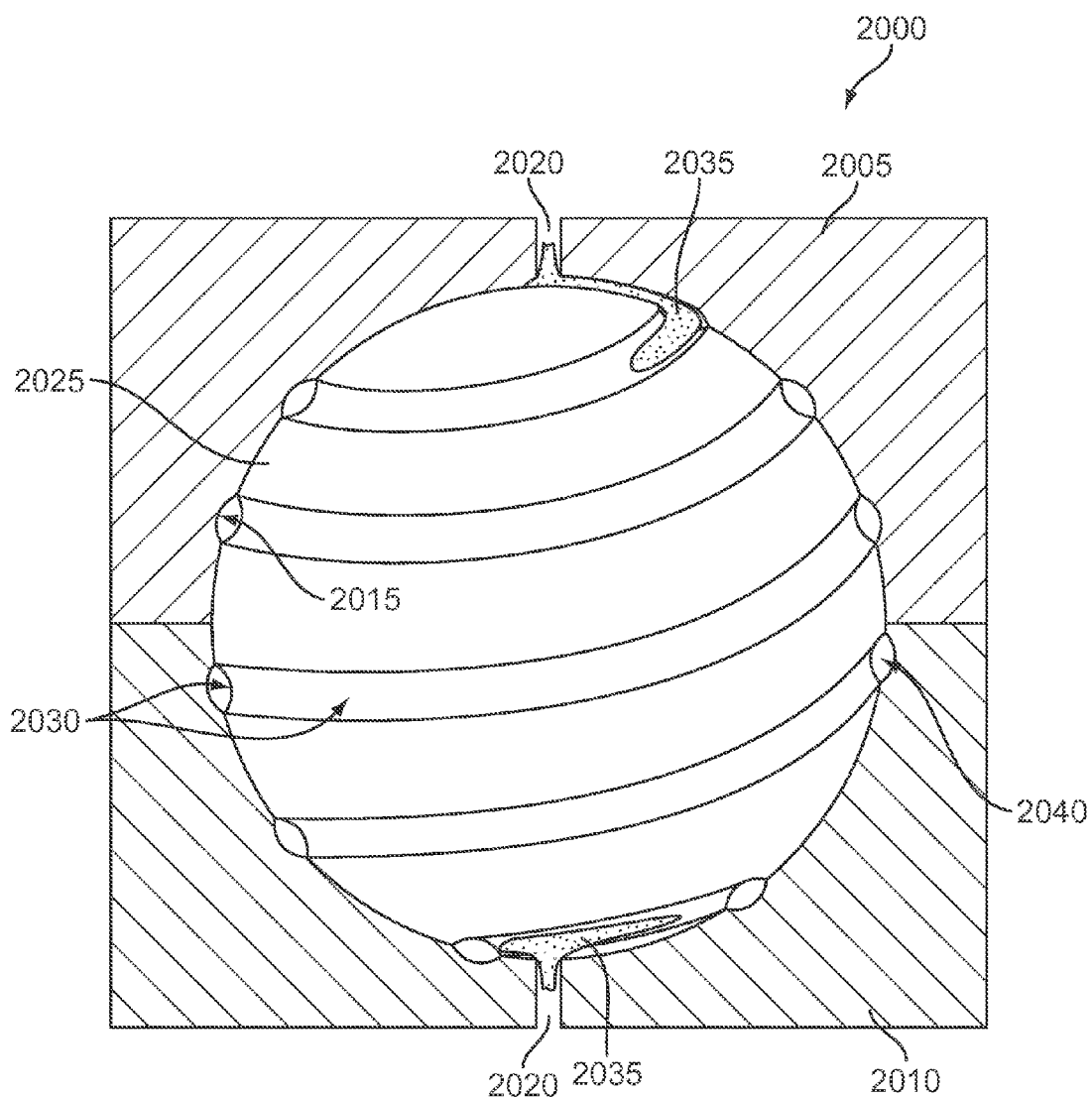
FIG. 20 shows a partial cross-sectional view of an alternative apparatus and method for molding components of a golf ball.

FIGS. 19 and 20 illustrate an apparatus and method for making a golf ball according to the embodiment shown in FIG. 3, including molding a grooved outer cover layer and molding a groove material into recess grooves on the pre-molded outer cover layer. FIG. 19 illustrates an outer cover layer mold 1900 configured to pre-mold the outer cover layer. Mold 1900 may include a first mold section 1905, and a second mold section 1910. Mold 1900 may further include spiral protrusions 1915, which may be configured to form channel-type recess grooves, such as grooves 330 shown in FIG. 3. It will be noted that outer portions of mold 1900 are shown in cross-section, while a spherical inner void is shown in elevation to illustrate the arrangement of spiral protrusions 1915 along the walls of the spherical void. Mold 1900 may be used to injection mold outer cover layer material into injection gates 1920 to form an outer cover layer radially outward of one or more inner core layers and, in some embodiments, radially outward of one or more inner cover layers, thus forming a pre-molded golf ball component.

FIG. 20 illustrates an exemplary method of injecting a groove material into grooves 2030 formed in a pre-molded golf ball component 2025. FIG. 20 shows a groove material mold 2000. Mold 2000 may include a first mold section 2005 and a second mold section 2010. FIG. 20 also shows pre-molded golf ball component 2025 disposed within mold 2000. As shown in FIG. 20, mold 2000 may include a spiral groove 2015 configured to correspond with grooves 2030 in component 2025 to form a spiral void 2040 configured to receive groove material. In an exemplary method, groove material 2035 may be injected via injection gates 2020 into spiral void 2040, as shown in FIG. 20. Molding groove material 2035 in this manner may form groove material 2035 in recess groove 2030 such that the outer cover layer material extends between an inner surface of groove material 2035 and an outer surface of the inner cover layer.

Similar molds and methods may be used to form golf balls having other features of embodiments discussed above. For example, exemplary methods of making golf balls may include forming the grooves completely through the outer cover layer, and molding the groove material such that an inner surface of the groove material is in contact with an outer surface of the inner cover layer. Further, similar molds and methods may be used for form the grooves in any suitable size, shape, and arrangement, including those discussed above. For example, such molds and methods may be used to form grooves having angled side walls, rounded bottom surfaces, planar bottom surfaces, and other configurations discussed above. Also, similar molds and methods may be implemented to form the groove material in any of the various configurations discussed above.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Features of any embodiment described in the present disclosure may be included in any other embodiment described in the present disclosure. Also, various modifications and changes may be made within the scope of the attached claims.

What is claimed is:

1. A method of making a golf ball, comprising:
molding at least one core layer;
molding an outer cover layer radially outward of the at least one core layer, from an outer cover layer material, including forming one or more grooves extending radially inward from an outer surface of the outer cover layer; and
molding a groove material within the one or more grooves, the groove material having a compressibility that is different from a compressibility of the outer cover layer material, wherein molding the groove material includes forming the groove material such that an outer surface of the groove material extends radially outward beyond the outer surface of the outer cover layer.

2. The method of claim 1, further including, molding an inner cover layer of an inner cover layer material between the at least one core layer and the outer cover layer.

3. The method of claim 2, wherein forming the one or more grooves includes forming the one or more grooves completely through the outer cover layer, and wherein molding the groove material includes forming an inner surface of the groove material in contact with an outer surface of the inner cover layer.

4. The method of claim 2, wherein molding the outer cover layer includes forming the one or more grooves as recesses in the outer cover layer, and wherein molding the groove material forms the groove material in the recesses such that the outer cover layer material extends between an inner surface of the groove material and an outer surface of the inner cover layer.

5. The method of claim 1, wherein the groove material is more compressible than the outer cover layer material.

6. The method of claim 1, wherein molding the outer cover layer includes forming the one or more grooves in the form of one or more elongate channels arranged in a spiral configuration.

7. The method of claim 1, wherein molding the groove material includes forming the groove material from one or more portions of the inner cover layer material that extends radially outward into the one or more grooves.

8. The method of claim 7, wherein molding the inner cover layer is performed by injection molding the inner cover layer beneath a preformed outer cover layer shell.

9. The method of claim 8, wherein the at least one core layer is supported within the outer cover layer shell by a plurality of support mold pins.

10. The method of claim 9, wherein the support mold pins are removable and the method includes removing the support mold pins during the process of molding the inner cover layer.

11. The method of claim 9, wherein the support mold pins are formed as part of the at least one core layer and meld with inner cover layer material during injection of the inner cover layer material.

12. A method of making a golf ball, comprising:
molding at least one core layer;
molding an outer cover layer radially outward of the at least one core layer, from an outer cover layer material, including forming one or more grooves extending radially inward from an outer surface of the outer cover layer; and
molding a groove material within the one or more grooves, the groove material having a compressibility that is different from a compressibility of the outer cover layer material, wherein molding the groove material includes forming the groove material such that an outer surface of the groove material is recessed from the outer surface of the outer cover layer.

13. The method of claim 12, wherein the groove material is more compressible than the outer cover layer material.

14. The method of claim 12, wherein molding the outer cover layer includes forming the one or more grooves in the form of one or more elongate channels arranged in a spiral configuration.

15. The method of claim 12, further including, molding an inner cover layer of an inner cover layer material between the at least one core layer and the outer cover layer.

16. The method of claim 15, wherein forming the one or more grooves includes forming the one or more grooves completely through the outer cover layer, and wherein molding the groove material includes forming an inner surface of the groove material in contact with an outer surface of the inner cover layer.

17. The method of claim 15, wherein molding the outer cover layer includes forming the one or more grooves as recesses in the outer cover layer, and wherein molding the groove material forms the groove material in the recesses such that the outer cover layer material extends between an inner surface of the groove material and an outer surface of the inner cover layer.

18. The method of claim 15, wherein molding the groove material includes forming the groove material from one or more portions of the inner cover layer material that extends radially outward into the one or more grooves.

19. The method of claim 15, wherein molding the inner cover layer is performed by injection molding the inner cover layer beneath a preformed outer cover layer shell.

20. The method of claim 19, wherein the at least one core layer is supported within the outer cover layer shell by a plurality of support mold pins.

21. The method of claim 20, wherein the support mold pins are removable and the method includes removing the support mold pins during the process of molding the inner cover layer.

22. The method of claim 20, wherein the support mold pins are formed as part of the at least one core layer and meld with inner cover layer material during injection of the inner cover layer material.

23. A method of making a golf ball, comprising:
molding at least one core layer;
molding an outer cover layer radially outward of the at least one core layer, from an outer cover layer material, including forming one or more grooves extending radially inward from an outer surface of the outer cover layer; and
molding a groove material within the one or more grooves, the groove material having a compressibility that is less than a compressibility of the outer cover layer material, wherein molding the groove material includes forming the groove material such that an outer surface of the groove material is substantially flush with the outer surface of the outer cover layer, and such that the outer cover layer material constitutes a substantial majority of the outer surface area of the golf ball.

24. The method of claim 23, wherein molding the outer cover layer includes forming the one or more grooves in the form of one or more elongate channels arranged in a spiral configuration.

25. The method of claim 23, further including, molding an inner cover layer of an inner cover layer material between the at least one core layer and the outer cover layer.

26. The method of claim 25, wherein forming the one or more grooves includes forming the one or more grooves completely through the outer cover layer, and wherein molding the groove material includes forming an inner surface of the groove material in contact with an outer surface of the inner cover layer.

27. The method of claim 25, wherein molding the outer cover layer includes forming the one or more grooves as recesses in the outer cover layer, and wherein molding the groove material forms the groove material in the recesses such that the outer cover layer material extends between an inner surface of the groove material and an outer surface of the inner cover layer.

28. The method of claim 25, wherein molding the groove material includes forming the groove material from one or more portions of the inner cover layer material that extends radially outward into the one or more grooves.

29. The method of claim 25, wherein molding the inner cover layer is performed by injection molding the inner cover layer beneath a preformed outer cover layer shell.

30. The method of claim 29, wherein the at least one core layer is supported within the outer cover layer shell by a plurality of support mold pins.

31. The method of claim 30, wherein the support mold pins are removable and the method includes removing the support mold pins during the process of molding the inner cover layer.

32. The method of claim 30, wherein the support mold pins are formed as part of the at least one core layer and meld with inner cover layer material during injection of the inner cover layer material.

\* \* \* \* \*